US012706677B2

(12) United States Patent
Nagarajan et al.

(10) Patent No.: US 12,706,677 B2
(45) Date of Patent: Aug. 11, 2026

(54) RECONFIGURABLE OPTICAL TRANSCEIVER FOR USE WITH MULTIPLE MODULATION TECHNIQUES

(71) Applicant: Marvell Asia Pte Ltd, Singapore (SG)

(72) Inventors: Radhakrishnan Nagarajan, Santa Clara, CA (US); Masaki Kato, Palo Alto, CA (US); Gary Mak, Santa Clara, CA (US)

(73) Assignee: Marvell Asia Pte Ltd, Singapore (SG)

( * ) Notice: Subject to any disclaimer, the term of this patent is extended or adjusted under 35 U.S.C. 154(b) by 293 days.

(21) Appl. No.: 18/136,759

(22) Filed: Apr. 19, 2023

(65) Prior Publication Data

US 2023/0336248 A1 Oct. 19, 2023

Related U.S. Application Data

(60) Provisional application No. 63/332,310, filed on Apr. 19, 2022.

(51) Int. Cl.
*H04B 10/516* (2013.01)
*H04B 10/50* (2013.01)

(52) U.S. Cl.
CPC ......... *H04B 10/516* (2013.01); *H04B 10/503* (2013.01)

(58) Field of Classification Search
CPC ........................... H04B 10/516; H04B 10/503
See application file for complete search history.

(56) References Cited

U.S. PATENT DOCUMENTS 8,073,345 B2 12/2011 Chen
8,971,677 B2 3/2015 Sakamaki
10,763,968 B1 9/2020 Li
11,333,831 B2 5/2022 Dong
2009/0060511 A1* 3/2009 Toyoshima ............. H04L 7/033 398/74
2012/0087661 A1 4/2012 Look
2016/0204868 A1* 7/2016 Celo .................... H04B 10/506 398/79
2016/0373133 A1* 12/2016 Karar ................. H03M 13/1111
2016/0380698 A1* 12/2016 Elahmadi ................ G02B 6/00 398/135
2022/0286208 A1* 9/2022 Wang ................. H04B 10/5051

(Continued)

FOREIGN PATENT DOCUMENTS

WO WO-2020180472 A1 * 9/2020 ......... H01S 3/10061

OTHER PUBLICATIONS

Corsini et al., “90 Degree Hybrid Coupler,” Major Qualifying Project submission, Worcester Polytechnic Institute, 127 pages (2013).

(Continued)

*Primary Examiner* — Pranesh K Barua

(57) ABSTRACT

An optical module includes a plurality of lasers, each of at least some of the lasers configured to be selectively turned on and turned off depending on a type of modulation to be used. Each laser corresponds to a respective wavelength. The optical module also includes an optical modulation system having a plurality of optical modulators. A reconfigurable optical network of the optical module is configured to selectively direct light from the plurality of lasers to the optical modulation system differently depending on the type of modulation to be used.

23 Claims, 13 Drawing Sheets

(56) References Cited

U.S. PATENT DOCUMENTS

| | | | | |
|---|---|---|---|---|
| 2023/0216587 | A1* | 7/2023 | Ghannouchi .... | H04B 10/25754 398/116 |
| 2025/0184029 | A1* | 6/2025 | Dong ...................... | H04J 14/06 |

OTHER PUBLICATIONS

International Search Report and Written Opinion for International Application No. PCT/US2023/019140 mailed on Jul. 31, 2023. (13 pages).
Kikuchi, "Fundamentals of Coherent Optical Fiber Communications," J. Lightwave Tech., vol. 34, No. 1, pp. 157-179 (2016).
Schaefer et al., "Comparison of Homodyne and Intradyne Detection for High-Order Modulation Schemes in Optical Intersatellite Communication Systems," 2015 IEEE Int'l Conf. Space Optical Systems and Applications (ICSOS), Oct. 26-28, 2015, 5 pages (2015).
Yin et al., "DLI-Based DP-QPSK Reception Scheme for Short-Range Optical Communication," Appl. Sci. 2020, No. 14, p. 4815 (2020).
"Technical note—Si photodiodes," Hamamatsu Photonics K.K., 18 pages (May 2022).

* cited by examiner

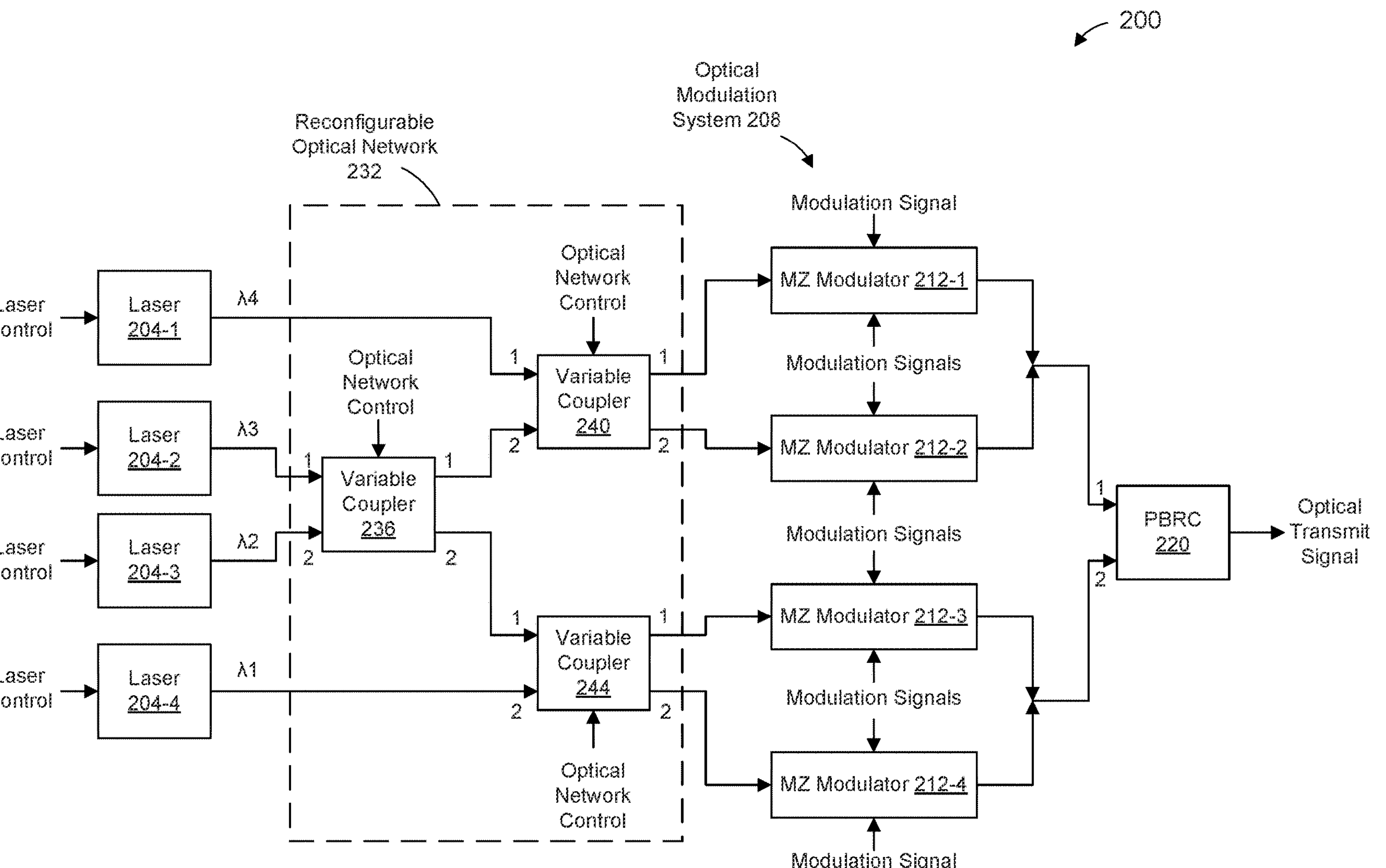
FIG. 2A
200
Reconfigurable Optical Network 232
Optical Modulation System 208
Laser Control
Laser 204-1
Laser Control
Laser 204-2
Laser Control
Laser 204-3
Laser Control
Laser 204-4
λ4
λ3
λ2
λ1
Optical Network Control
Variable Coupler 236
Optical Network Control
Variable Coupler 240
Variable Coupler 244
Optical Network Control
1
2
Modulation Signal
MZ Modulator 212-1
Modulation Signals
MZ Modulator 212-2
Modulation Signals
MZ Modulator 212-3
Modulation Signals
MZ Modulator 212-4
Modulation Signal
PBRC 220
Optical Transmit Signal

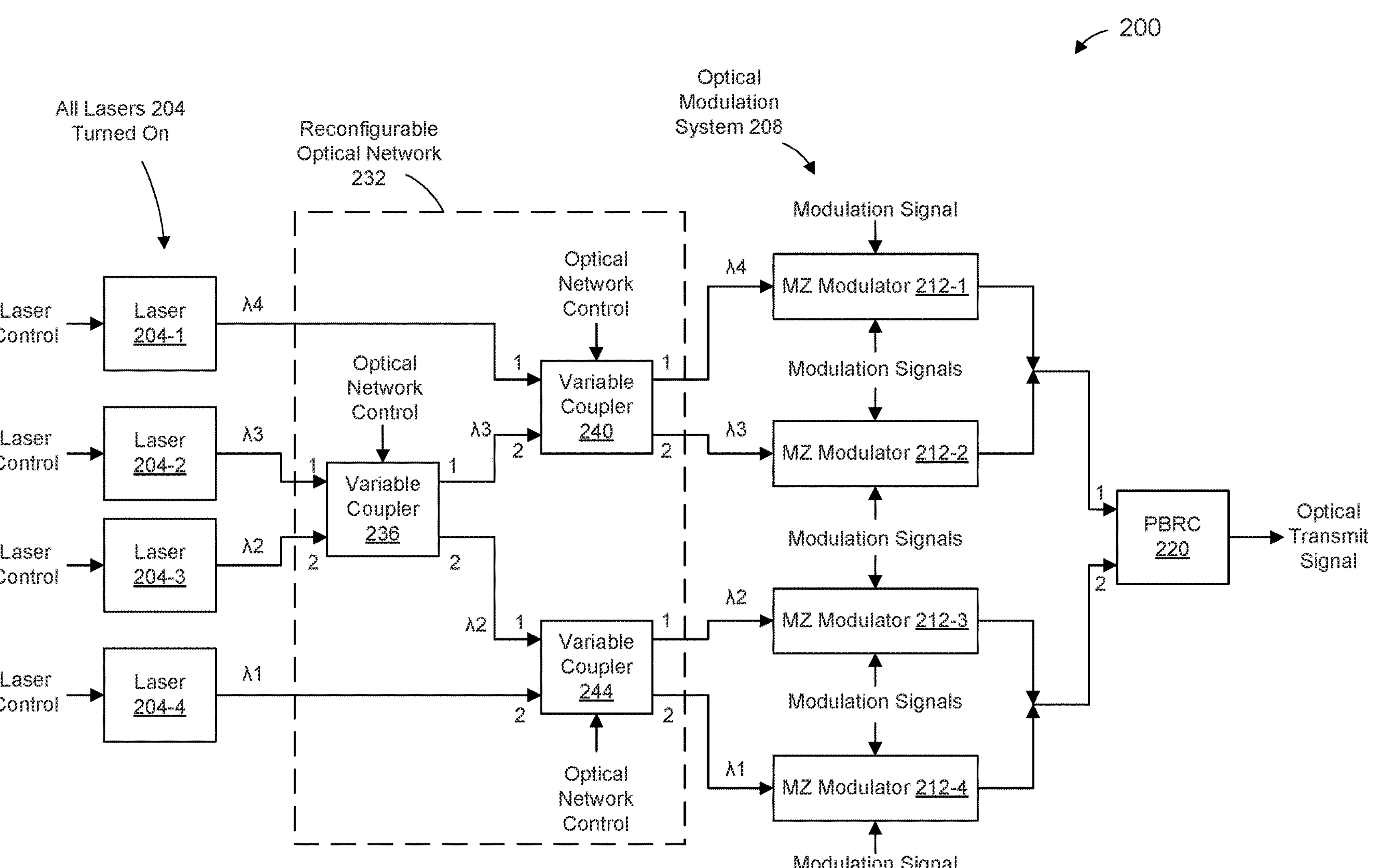
FIG. 2B
200
All Lasers 204 Turned On
Reconfigurable Optical Network 232
Optical Modulation System 208
Laser Control
Laser 204-1
Laser Control
Laser 204-2
Laser Control
Laser 204-3
Laser Control
Laser 204-4
λ4
λ3
λ2
λ1
Optical Network Control
Variable Coupler 236
Optical Network Control
Variable Coupler 240
Variable Coupler 244
Optical Network Control
Modulation Signal
MZ Modulator 212-1
Modulation Signals
MZ Modulator 212-2
Modulation Signals
MZ Modulator 212-3
Modulation Signals
MZ Modulator 212-4
Modulation Signal
PBRC 220
Optical Transmit Signal

Figures 5A, 5B:
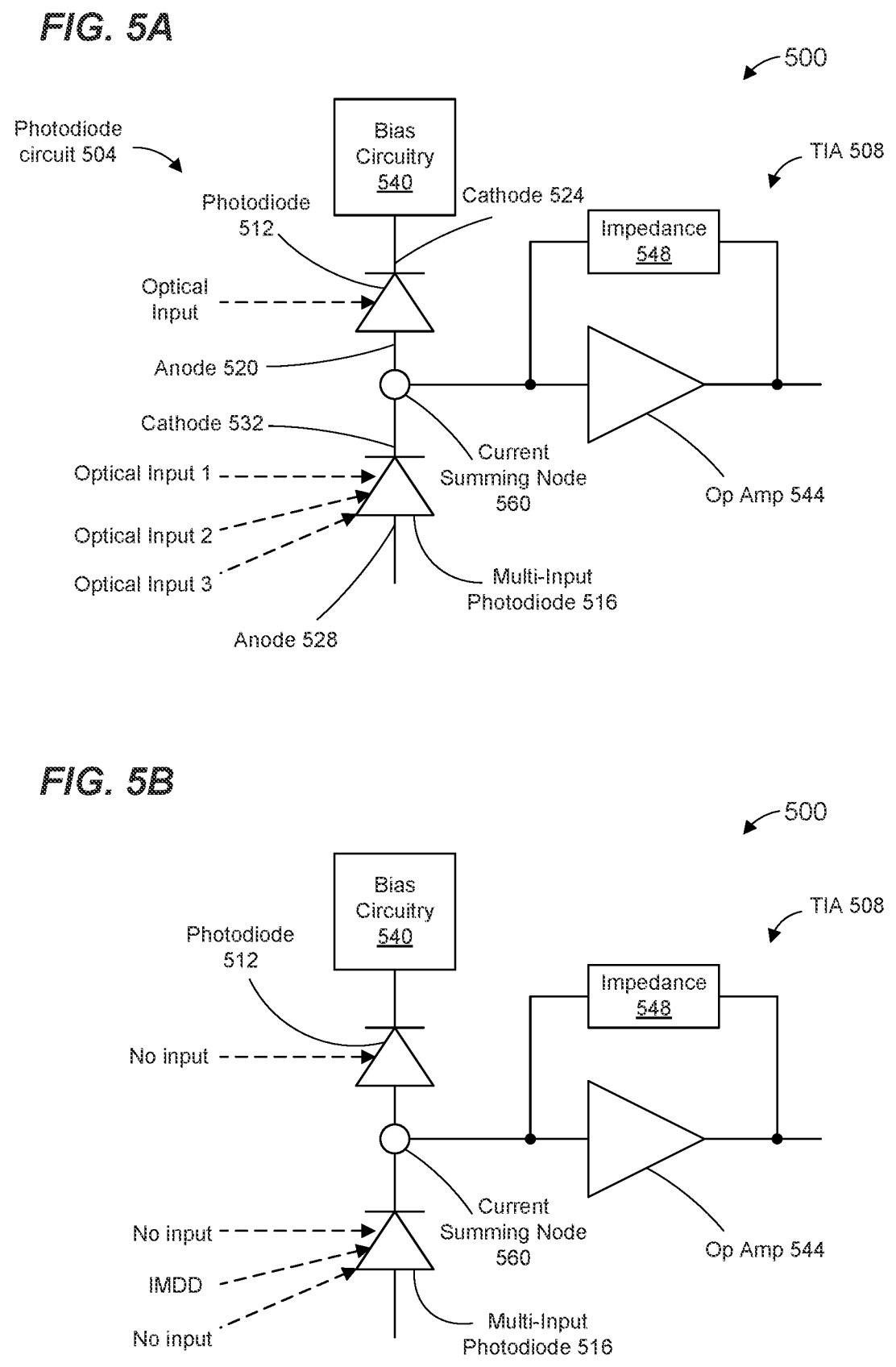

Photodiode circuit 504

Bias Circuitry 540

TIA 508

Photodiode 512

Cathode 524

Impedance 548

Optical Input

Anode 520

Cathode 532

Optical Input 1

Current Summing Node 560

Op Amp 544

Optical Input 2

Optical Input 3

Multi-Input Photodiode 516

Anode 528

Bias Circuitry 540

TIA 508

Photodiode 512

Impedance 548

No input

Current Summing Node 560

No input

Op Amp 544

IMDD

No input

Multi-Input Photodiode 516

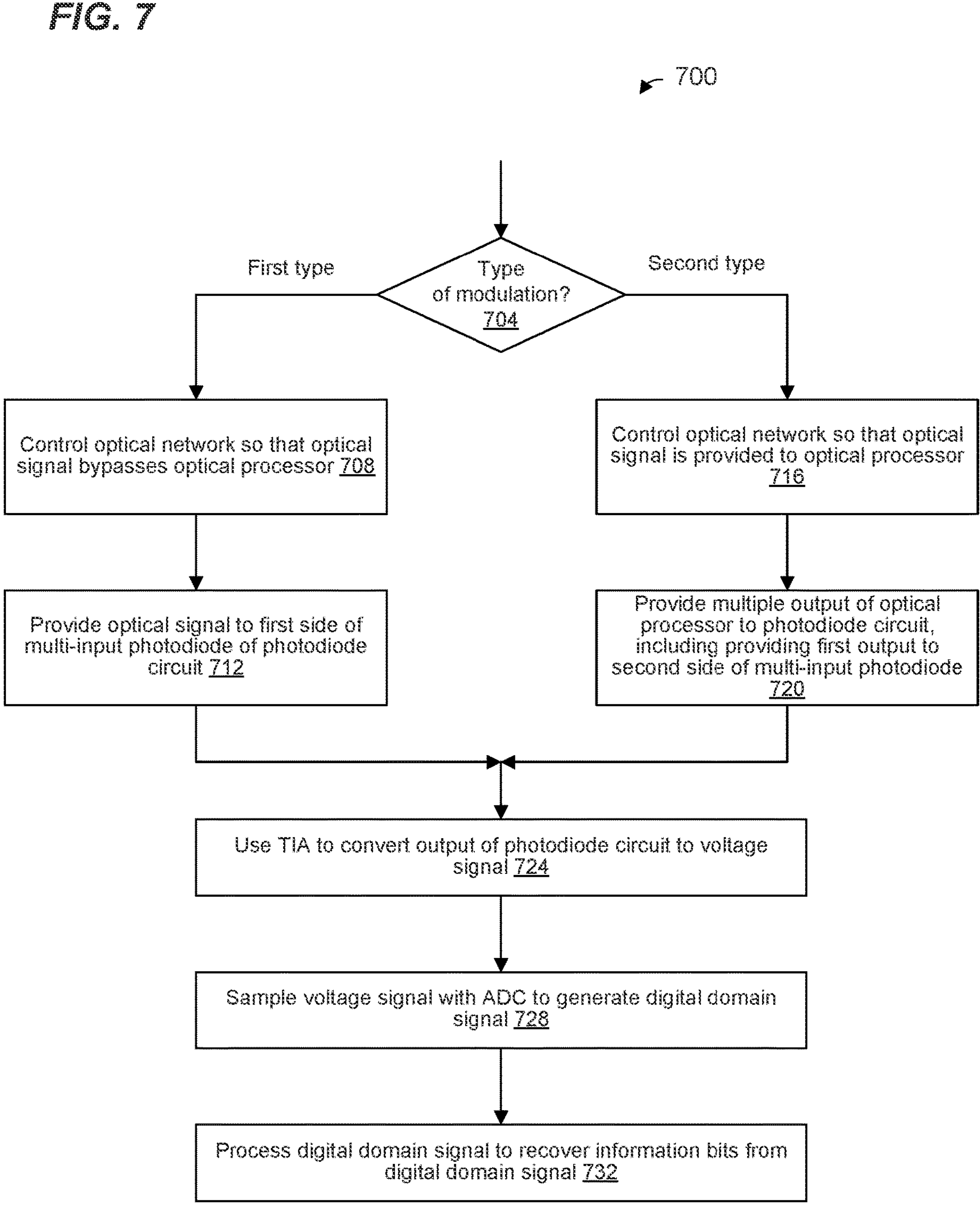
FIG. 7
700
Type of modulation? 704
First type
Second type
Control optical network so that optical signal bypasses optical processor 708
Control optical network so that optical signal is provided to optical processor 716
Provide optical signal to first side of multi-input photodiode of photodiode circuit 712
Provide multiple output of optical processor to photodiode circuit, including providing first output to second side of multi-input photodiode 720
Use TIA to convert output of photodiode circuit to voltage signal 724
Sample voltage signal with ADC to generate digital domain signal 728
Process digital domain signal to recover information bits from digital domain signal 732

RECONFIGURABLE OPTICAL TRANSCEIVER FOR USE WITH MULTIPLE MODULATION TECHNIQUES

CROSS REFERENCES TO RELATED APPLICATIONS

This application claims the benefit of U.S. Provisional Patent App. No. 63/332,310, entitled "Format Agnostic Receiver for Direct and Coherent Detection," filed on Apr. 19, 2022, the disclosure of which is expressly incorporated herein by reference in its entirety.

FIELD OF TECHNOLOGY

This disclosure relates generally to optical communications, and more particularly to optical transceivers.

BACKGROUND

During this time of growth of Internet technologies and usage, demand for high speed data transmission has increased rapidly. As an example, average internet traffic in 2021 was estimated to exceed 700 terabytes per second. Technologies to support such sustained usage levels will continue to proliferate. Optical transmission of data can support vast amounts of data per channel—often limited more by the rate at which electronics can encode a signal onto the optical channel rather than the bandwidth of the channel itself. Improvements to optical modulation performance will continue to drive adoption of such technologies.

There are a number of different modulation techniques currently in use for optical communications. Examples of such modulation techniques include: i) intensity modulation techniques such as intensity-modulation, direct detection (IMDD), dual polarization IMDD; and ii) coherent modulation techniques such as quadrature phase shift keying (QPSK) modulation, dual polarization QPSK (DP-QPSK) modulation, differential QPSK (DQPSK) modulation, dual polarization DQPSK, M-ary quadrature amplitude modulation (M-QAM), dual polarization M-QAM, etc. A typical optical transceiver is capable of generating and receiving only one type of optical modulation (or a small subset of the various currently available types of optical modulation). For example, a typical optical transceiver capable of generating and receiving IMDD-modulated optical signals is not capable of generating or receiving QPSK- or M-QAM-modulated optical signals. As another example, a typical optical transceiver capable of generating and receiving QPSK- or M-QAM-modulated optical signals is not capable of generating or receiving IMDD-modulated optical signals.

SUMMARY

In an embodiment, an optical module for use with multiple optical modulation techniques comprises: a plurality of lasers, each of at least some of the lasers configured to be selectively turned on and turned off depending on a type of modulation to be used, each laser corresponding to a respective wavelength; an optical modulation system comprising a plurality of optical modulators; and a reconfigurable optical network that is configured to selectively direct light from the plurality of lasers to the optical modulation system differently depending on the type of modulation to be used. In another embodiment, a method of controlling a reconfigurable optical module for transmitting information via an optical medium includes: determining, at a controller, a type of modulation that is to be used to transmit the information via the optical medium, the type of modulation being determined from a plurality of different types of optical modulation techniques, including at least a first type and a second type; controlling, by the controller, a plurality of lasers of the reconfigurable optical module to one of i) turn on or ii) turn off at least some of lasers among the plurality of lasers depending on the type of modulation to be used, each laser corresponding to a respective wavelength; and controlling, by the controller, a reconfigurable optical network of the reconfigurable optical module to selectively direct light from the plurality of lasers to an optical modulation system of the reconfigurable optical module differently depending on the type of modulation to be used.

In yet another embodiment, an optical module for use with multiple optical modulation techniques comprises: optical-to-electrical conversion circuitry that includes a plurality of photodiodes coupled to a plurality of transimpedance amplifiers (TIAs), the plurality of photodiodes including multiple-input photodiodes, each multiple-input photodiode including a first side and a second side that is opposite the first side; an optical processor that is configured to optically process one or more optical signals corresponding to coherent modulation, the optical processor being coupled to the plurality of photodiodes, including multiple outputs of the optical processor coupled to the respective first sides of the multiple-input photodiodes; and an optical network that is configured to i) in a first configuration corresponding to a first modulation technique, direct optical signals corresponding to light received via an optical medium to the respective second sides of the multiple-input photodiodes so that the light bypasses the optical processor, and ii) in a second configuration corresponding to a second modulation technique, direct one or more optical signals corresponding to light received via the optical medium to one or more inputs of the optical processor.

In still another embodiment, a method is for operating a reconfigurable optical module that includes optical-to-electrical conversion circuitry that includes a plurality of photodiodes coupled to a plurality of TIAs. The plurality of photodiodes includes multiple-input photodiodes, each multiple-input photodiode having a first side and a second side that is opposite the first side. The optical module further comprises an optical processor that is configured to optically process one or more optical signals corresponding to coherent modulation, the optical processor being coupled to the plurality of photodiodes. Multiple outputs of the optical processor are coupled to the respective first sides of the multiple-input photodiodes. The method includes: determining, at a controller, a type of modulation for which the reconfigurable optical module is to process optical signals received via an optical medium, the type of modulation being determined from a plurality of different types of optical modulation techniques, including at least a first type and a second type; and controlling, by a controller, a reconfigurable optical network of the reconfigurable optical module to selectively i) in a first configuration corresponding to a first modulation technique, direct optical signals corresponding to light received via the optical medium to respective first sides of the multiple-input photodiodes so that the light bypasses the optical processor, and ii) in a second configuration corresponding to a second modulation technique, direct one or more optical signals corresponding to light received via the optical medium to one or more inputs of the optical processor.

BRIEF DESCRIPTION OF THE DRAWINGS

FIG. 2A is a simplified block diagram of a reconfigurable optical module used in the optical transmitter of FIG. 1, according to an embodiment.

FIG. 2B is an illustration of the reconfigurable optical module of FIG. 2A in a first configuration in which the optical module is configured to generate signals modulated according to a first modulation technique, according to an embodiment.

FIG. 5A is a simplified diagram of an example optical-to-electrical conversion circuit for use with the reconfigurable optical receiver of FIG. 3 and/or the reconfigurable optical module of FIG. 4A, according to an embodiment.

FIG. 5B is a diagram of the optical-to-electrical conversion circuit of FIG. 5A operating when the optical receiver is operating in the first configuration corresponding to FIG. 4B, according to an embodiment.

FIG. 7 is a flow diagram of an example method for operating a reconfigurable optical receiver that is capable of demodulating optical signals that are modulated according to different optical modulation techniques, according to an embodiment.

DETAILED DESCRIPTION

As discussed above, typical optical transceivers are capable of generating and receiving optical signals according to only one type of optical modulation (or a small subset of the various currently available types of optical modulation). For example, a typical optical transceiver capable of generating and demodulating amplitude-modulated optical signals is not capable of generating or demodulating coherent-modulated optical signals. As another example, a typical optical transceiver capable of generating and receiving coherent-modulated optical signals is not capable of generating and receiving amplitude-modulated optical signals.

In embodiments described below, a reconfigurable optical transmitter is capable of generating optical signals that are modulated according to various optical modulation techniques. As an illustrative example, an optical transmitter is capable of generating amplitude-modulated optical signals, and can be reconfigured to generate coherent-modulated optical signals, according to some embodiments.

The reconfigurable optical transceiver utilizes an innovative optical network that is reconfigurable to i) provide light from a plurality of lasers to respective inputs of an optical modulation system in a first configuration for amplitude-modulation, and ii) provide light from a single laser to multiple inputs of the optical modulation system in a second configuration for coherent-modulation, according to some embodiments.

In other embodiments described below, a reconfigurable optical receiver is capable of demodulating optical signals that are modulated according to various optical modulation techniques. As an illustrative example, an optical receiver is capable of demodulating amplitude-modulated optical signals, and can be reconfigured to demodulate coherent-modulated optical signals, according to some embodiments.

The reconfigurable optical receiver utilizes an innovative optical-to-electrical conversion circuit that is capable of processing optical signals that are modulated according to various optical modulation techniques, according to some embodiments. For example, the optical-to-electrical conversion circuit is capable of processing amplitude-modulated signals as well as coherent-modulated signals, according to some embodiments. On the other hand, typical optical receivers use either a first optical-to-electrical conversion circuit configured for processing amplitude-modulated signals or a second optical-to-electrical conversion circuit configured for processing coherent-modulated signals, i.e., where the first optical-to-electrical conversion circuit is different than the second optical-to-electrical conversion circuit.

Figure 1:
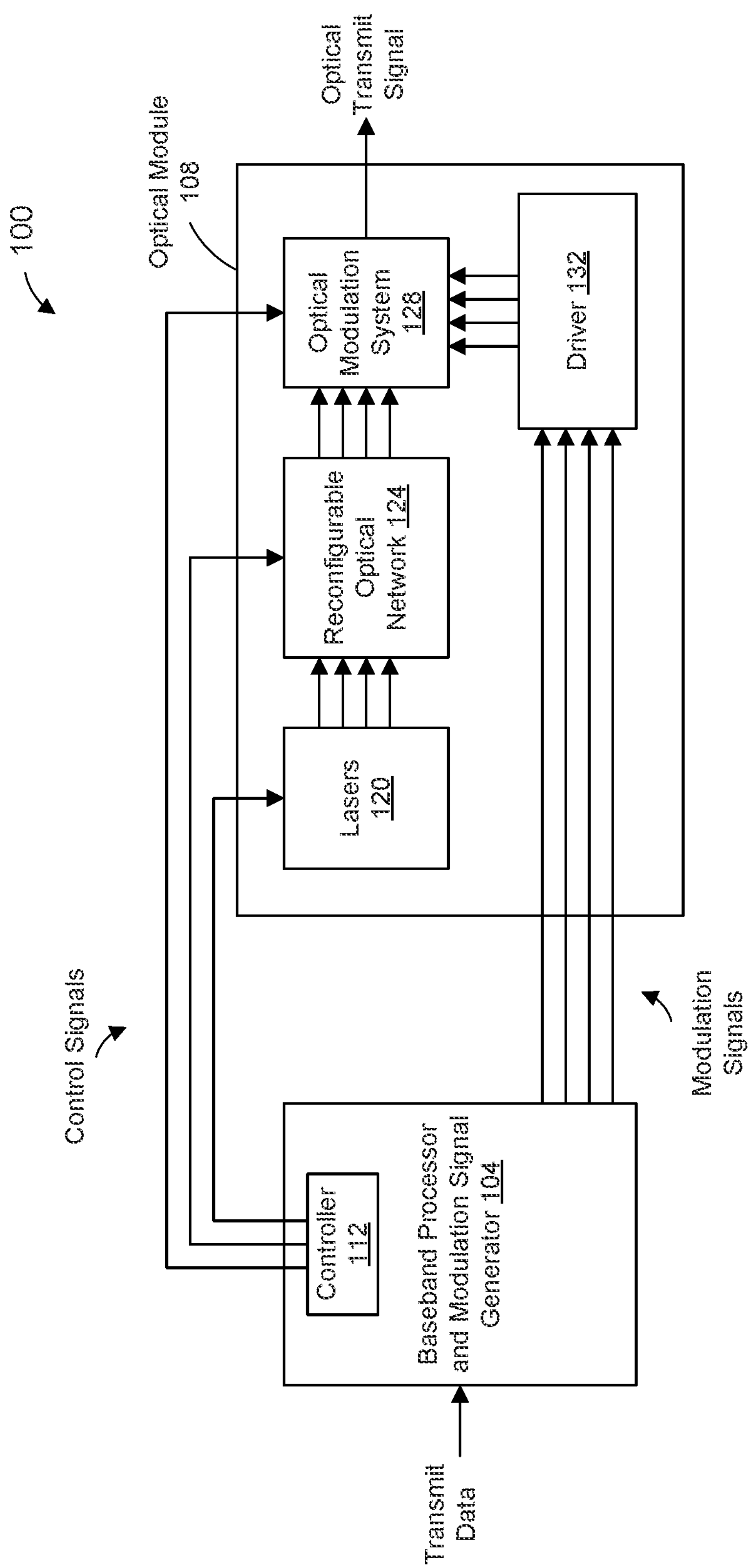
FIG. 1 is a simplified block diagram of an example optical transmitter that is reconfigurable to generate amplitude-modulated and coherent-modulated signals, according to an embodiment.

FIG. 1 is a simplified diagram of an example optical transmitter 100 that is reconfigurable to generate amplitude-modulated and coherent-modulated signals, according to an embodiment. The optical transmitter 100 comprises a baseband processor and modulation signal generator 104 (sometimes referred to herein as the "baseband processor 104" for brevity) that is configured to i) receive data (e.g., from a host processor (not shown)) that is to be transmitted via an optical communication medium (not shown), and ii) use the received data to generate modulation signals.

The optical transmitter 100 also comprises an optical module 108 coupled to the baseband processor 104. The optical module 108 is configured to use the modulation signals from the baseband processor 104 to generate an optical transmit signal for transmission via the optical communication medium.

The baseband processor 104 includes a digital signal processor (DSP, not shown) that is configured to perform various processing actions such as one or more of i) forward error correction (FEC) encoding, ii) signal pre-compensation, etc. Additionally, the DSP is also configured to map data that is to be transmitted to transmission symbols (e.g., to intensity levels for intensity modulation, to constellation points for M-QAM, etc.). The DSP is further configured to generate digital modulation signals based on the transmissions symbols.

The baseband processor 104 also comprises analog front end (AFE) circuitry (not shown) that is configured to generate analog modulation signals based on the digital modulation signals output by the DSP. For example, the AFE includes one or more analog-to-digital converters (ADCs) that are configured to convert the digital modulation signals to analog modulation signals.

The baseband processor 104 also comprises a controller 112 that is configured to generate control signals for reconfiguring the optical module 108 for generating the optical transmit signal according to different modulation techniques. In other embodiments, the controller 112 is external to the baseband processor 104. The controller 112 comprises a processor coupled to a memory, and the processor is configured to execute machine-readable instructions in the memory that, when executed by the processor, cause the controller 112 to generate the control signals, according to an embodiment. Additionally or alternatively, the controller 112 comprises hardware circuitry (e.g., a hardware state machine) that additionally or alternatively causes the controller 112 to generate the control signals, in another embodiment.

The optical module 108 comprises a plurality of lasers 120 optically coupled to a reconfigurable optical network 124. The reconfigurable optical network 124 is optically coupled to an optical modulation system 128. The optical module 108 also comprises driver circuitry 132 coupled to the optical modulation system 128.

In an embodiment, each laser in the plurality of lasers 120 is configured to generate light at a respective wavelength. Each of at least some of the plurality of lasers 120 is configured to be turned on and off based on a respective control signal from the controller 112. For example, in a first configuration of the optical module 108 multiple lasers 120 (e.g., all of the lasers 120) are turned on by control signals from the controller 112; whereas in a second configuration of the optical module 108 only one of the lasers 120 is turned on and the remaining lasers 120 are turned off by control signals from the controller 112.

In an embodiment, the reconfigurable optical network 124 is configured to direct light from the plurality of lasers 120 to the optical modulation system 128 differently depending on control signals from the controller 112. For example, in the first configuration of the optical module 108 control signals from the controller 112 control the reconfigurable optical network 124 to direct light from respective lasers 120 at respective wavelengths to respective optical inputs of the optical modulation system 128; whereas in the second configuration of the optical module 108 control signals from the controller 112 control the reconfigurable optical network 124 to direct light from one of the lasers 120 to multiple optical inputs of the optical modulation system 128.

In an embodiment, the controller 112 configures, using modulation control signals generated by the controller 112, the optical modulation system 128 differently depending on the type of modulation to be used. For example, in the first configuration of the optical module 108, modulation control signals from the controller 112 configure the optical modulation system 128 for a first type of modulation; whereas in the second configuration of the optical module 108, modulation control signals from the controller 112 configure the optical modulation system 128 for a second type of modulation. As an illustrative example, the modulation control signals i) select a first modulator operating point of optical modulators of the optical modulation system 128 for the first type of modulation, and ii) select a second modulator operating point (different than the first modulator operating point) of the optical modulators for the second type of modulation.

The driver circuitry is configured to condition modulation signals received from the baseband processor 104 to generate conditioned modulation signals, and to provide the conditioned modulation signals to the optical modulation system 128. The optical modulation system 128 then modulates light received from the reconfigurable optical network 124 based on the conditioned modulation signals. In some embodiments, the driver circuitry 132 is included in the baseband processor 104, for example as part of the AFE circuitry discussed above.

In operation, when data is to be transmitted via multiple wavelengths using intensity modulation, the baseband processor 104 generates control signals to turn on multiple lasers 120. Additionally, the baseband processor 104 generates control signals to configure the reconfigurable optical network 124 to direct light from respective lasers 120 at respective wavelengths to respective optical inputs of the optical modulation system 128. Additionally, the baseband processor 104 generates modulator control signals to configure optical modulators of the optical modulation system 128 for intensity modulation. For example, the baseband processor 104 generates modulator control signals to select an operating point of the optical modulators of the optical modulation system 128 to be a first modulator operating point suitable for intensity modulation.

Additionally, the baseband processor 104 generates, using received data (e.g., from a host computer), modulation signals that correspond to intensity modulation, and provides the modulation signals to the driver 132. The driver 132 then provides conditioned modulation signals to the optical modulation system 128, which causes the optical modulation system 128 to modulate data onto the multiple wavelengths using intensity modulation.

On the other hand, when data is to be transmitted via a single wavelength using coherent modulation, the baseband processor 104 generates control signals to turn on one lasers 120 and to turn off the other lasers 120. Additionally, the baseband processor 104 generates control signals to configure the reconfigurable optical network 124 to direct light from the one laser 120 to multiple optical inputs of the optical modulation system 128. Additionally, the baseband processor 104 generates modulator control signals to configure optical modulators of the optical modulation system 128 for coherent modulation. For example, the baseband processor 104 generates modulator control signals to select the operating point of the optical modulators of the optical modulation system 128 to be a second modulator operating point (different than the first operating point) suitable for coherent modulation.

Additionally, the baseband processor 104 generates, using received data (e.g., from a host computer), modulation signals corresponding to coherent modulation, and provides the modulation signals to the driver 132. The driver 132 then provides conditioned modulation signals to the optical modulation system 128, which causes the optical modulation system 128 to modulate data onto the one wavelength using coherent modulation.

FIG. 2A is a simplified block diagram of an example optical module 200 that can be reconfigured to generate an optical transmit signal according to different modulation techniques, according to an embodiment. The optical module 200 is used as the optical module 108 of FIG. 1, and FIG. 2A is described with reference to FIG. 1 for ease of explanation. In other embodiments, the optical module 200 is used in another suitable transmitter different than the transmitter 100 of FIG. 1. Similarly, the transmitter 100 uses a suitable optical module different than the optical module 200, in some embodiments.

The optical module 200 includes a plurality of lasers 204. In an embodiment, the plurality of lasers 204 are configured to generate light at respective different wavelengths. For example, in a communication system that uses fiber optic cables conforming to the ITU standard G.652, the lasers 204 are configured to generate light at 1271 nanometer (nm) (sometimes referred to as λ1); 1291 nm (sometimes referred to as λ2); 1311 nm (sometimes referred to as λ3); and 1331 nm (sometimes referred to as λ4). In other embodiments, the lasers 204 generate at other suitable wavelengths. The lasers 204 correspond to the lasers 120 (FIG. 1), in an embodiment.

The optical module 200 also includes an optical modulation system 208. The optical modulation system 208 comprises a plurality of optical modulators 212. In an embodiment, the optical modulators 212 comprise Mach-Zehnder (MZ) modulators. In other embodiments, the optical modulation system 208 comprises suitable optical modulators other than MZ modulators.

Each modulator 212 has i) an optical input to receive light and ii) two modulation signal inputs configured to receive modulation signals, e.g., from driver circuitry (not shown) such as the driver circuitry 132 (FIG. 1). Each modulator 212 is configured to modulate light received via the optical input based on the modulation signals received via the modulation signal inputs to generate a modulated optical output signal.

In an embodiment, the modulators 212 are configured differently depending on the type of modulation to be used. For example, in a first configuration of the optical module 200, modulation control signals (not shown), from the controller 112 for example, configure the modulators 212 for a first type of modulation; whereas in a second configuration of the optical module 200, the modulation control signals configure the modulators 212 for a second type of modulation. As an illustrative example, the modulation control signals i) select a first modulator operating point of the modulators 212 for the first type of modulation, and ii) select a second modulator operating point (different than the first modulator operating point) of the modulators 212 for the second type of modulation.

Outputs of the modulator 212-1 and the modulator 212-2 are combined and provided to a first input of a polarization beam rotator combiner (PBRC) 220. Similarly, outputs of the modulator 212-3 and the modulator 212-4 are combined and provided to a second input of the PBRC 220. The PBRC 220 is configured to combine light received via the two inputs of the PBRC 220 while rotating polarization of light corresponding to light received by a first input of the PBRC 220 by 90 degrees with respect to polarization of light corresponding to light received by a second input of the PBRC 220.

The lasers 204 are optically coupled to the optical modulation system 208 via a reconfigurable optical network 232. The reconfigurable optical network 232 is configured to direct light from the plurality of lasers 204 to the optical modulation system 208 differently depending on received control signals, such as from a controller such as the controller 112 (FIG. 1). For example, in a first configuration of the optical module 200 laser control signals from the controller control the reconfigurable optical network 232 to direct light from each of the lasers 204 to respective optical inputs of the optical modulation system 208; whereas in a second configuration of the optical module 200 laser control signals control the reconfigurable optical network 232 to direct light from one of the lasers 204 (e.g., the laser 204-2 or another suitable one of the lasers 204) to multiple optical inputs of the optical modulation system 208.

The reconfigurable optical network 232 comprises a plurality of variable optical couplers 236, 240, 244 that are arranged to, depending on a configuration of the reconfigurable optical network 232, either i) direct light from each of the lasers 204 to respective optical inputs of the optical modulation system 208, or ii) direct light from one of the lasers 204 (e.g., the laser 204-2 or another suitable one of the lasers 204) to multiple optical inputs of the optical modulation system 208. Each variable optical couplers 236, 240, 244 includes a first optical input, a second optical input, a first optical output, a second optical output, and a control input. Each variable optical coupler 236, 240, 244 is configured to direct light from the first optical input to the first optical output, and to direct light from the second optical input to the second optical output. Additionally, each variable optical coupler 236, 240, 244 is configured to selectively optically cross-couple light from the first optical input to the second optical output, and to selectively optically cross-couple light from the second optical input to the first optical output. For example, when a laser control signal is in a first state, the variable optical coupler 236, 240, 244 does not optically cross-couple light from the first optical input to the second optical output, and does not optically cross-couple light from the second optical input to the first optical output. On the other hand, when the laser control signal is in a second state, the variable optical coupler 236, 240, 244 optically cross-couples light from the first optical input to the second optical output, and optically cross-couples light from the second optical input to the first optical output.

An output of the laser 204-2 is coupled to the first input of the variable coupler 236, and an output of the laser 204-3 is coupled to the second input of the variable coupler 236. An output of the laser 204-1 is coupled to the first input of the variable coupler 240, and the first output of the variable coupler 236 is coupled to the second input of the variable coupler 240. An output of the laser 204-4 is coupled to the second input of the variable coupler 244, and the second output of the variable coupler 236 is coupled to the first input of the variable coupler 244. The first output of the variable coupler 240 is coupled to the optical input of the MZ modulator 212-1, and the second output of the variable coupler 240 is coupled to the optical input of the MZ modulator 212-2. The first output of the variable coupler 244 is coupled to the optical input of the MZ modulator 212-3, and the second output of the variable coupler 244 is coupled to the optical input of the MZ modulator 212-4.

In operation, when data is to be transmitted via multiple wavelengths using intensity modulation, the laser control signals are set to turn on all of the lasers 204. Additionally, the optical network control signals are set to configure the variable couplers 236, 240, 244 so that the variable couplers 236, 240, 244 do not provide cross-coupling between the respective first input to the respective second output, and between the respective second input to the respective first output. As a result, the reconfigurable optical network 232 delivers light from the laser 204-1 to the optical input of the MZ modulator 212-1; the reconfigurable optical network 232 delivers light from the laser 204-2 to the optical input of the MZ modulator 212-2; the reconfigurable optical network 232 delivers light from the laser 204-3 to the optical input of the MZ modulator 212-3; and the reconfigurable optical network 232 delivers light from the laser 204-4 to the optical input of the MZ modulator 212-4.

Additionally, modulator control signals (not shown) configure the MZ modulators 212 for intensity modulation. For example, the modulator control signals select the operating point of the MZ modulators 212 to be a first modulator operating point suitable for intensity modulation.

Additionally, the modulation signals control the MZ modulators 212 to modulate respective data onto the respective light received by the MZ modulators 212. Further, modulated light from the MZ modulator 212-1 and modulated light from the MZ modulator 212-2 are combined and provided to the first input of the PBRC 220; and modulated light from the MZ modulator 212-3 and modulated light from the MZ modulator 212-4 are combined and provided to the second input of the PBRC 220. The PBRC 220 combines the modulated light from the MZ modulator 212-1 and the MZ modulator 212-2 with the modulated light from the MZ modulator 212-3 and the MZ modulator 212-4 to generate the optical transmit signal.

On the other hand, when data is to be transmitted via a single wavelength using coherent modulation, the laser control signals are set to turn on the laser 204-2 and to turn off the other lasers 204. Additionally, the optical network control signals are set to configure the variable couplers 236, 240, 244 so that the variable couplers 236, 240, 244 cross-couple light between the respective first input to the respective second output, and between the respective second input to the respective first output. As a result, the reconfigurable optical network 232 delivers light from the laser 204-3 to the optical inputs of all of the MZ modulators 212.

Additionally, modulator control signals (not shown) configure the MZ modulators 212 for coherent modulation. For example, the modulator control signals select the operating point of the MZ modulators 212 to be a second modulator operating point (different than the first operating point) suitable for coherent modulation.

Further, modulation signals applied to the MZ modulator 212-1 cause the MZ modulator 212-1 to generate a first in-phase (I) signal, and modulation signals applied to the MZ modulator 212-2 cause the MZ modulator 212-2 to generate a first quadrature (Q) signal. Similarly, modulation signals applied to the MZ modulator 212-3 cause the MZ modulator 212-3 to generate a second I signal, and modulation signals applied to the MZ modulator 212-4 cause the MZ modulator 212-4 to generate a second Q signal. Further, the first I signal and the first Q signal are combined and provided to the first input of the PBRC 220; and the second I signal and the second Q signal are combined and provided to the second input of the PBRC 220. The PBRC 220 combines the first I signal and the first Q signal with the second I signal and the second Q signal to generate the optical transmit signal. The optical transmit signal includes: i) the first I signal and the first Q signal in a first polarization direction, and ii) the second I signal and the second Q signal in a second polarization direction.

FIG. 2B is a diagram of the optical module 200 of FIG. 2A configured to transmit data via multiple wavelengths using intensity modulation, according to an embodiment. The laser control signals are set to turn on all of the lasers 204. Additionally, the optical network control signals are set to configure the variable couplers 236, 240, 244 so that the variable couplers 236, 240, 244 do not provide cross-coupling between the respective first input to the respective second output, and between the respective second input to the respective first output. As a result, the reconfigurable optical network 232 delivers light from the laser 204-1 to the optical input of the MZ modulator 212-1; the reconfigurable optical network 232 delivers light from the laser 204-2 to the optical input of the MZ modulator 212-2; the reconfigurable optical network 232 delivers light from the laser 204-3 to the optical input of the MZ modulator 212-3; and the reconfigurable optical network 232 delivers light from the laser 204-4 to the optical input of the MZ modulator 212-4.

Additionally, modulator control signals (not shown) have configured the MZ modulators 212 for intensity modulation. For example, the modulator control signals have selected the operating point of the MZ modulators 212 to be the first modulator operating point suitable for intensity modulation.

Additionally, the modulation signals control the MZ modulators 212 to modulate respective data onto the respective light received by the MZ modulators 212. Further, modulated light from the MZ modulator 212-1 and modulated light from the MZ modulator 212-2 are combined and provided to the first input of the PBRC 220; and modulated light from the MZ modulator 212-3 and modulated light from the MZ modulator 212-4 are combined and provided to the second input of the PBRC 220. The PBRC 220 combines the modulated light from the MZ modulator 212-1 and the MZ modulator 212-2 with the modulated light from the MZ modulator 212-3 and the MZ modulator 212-4 to generate the optical transmit signal.

Figure 2C:
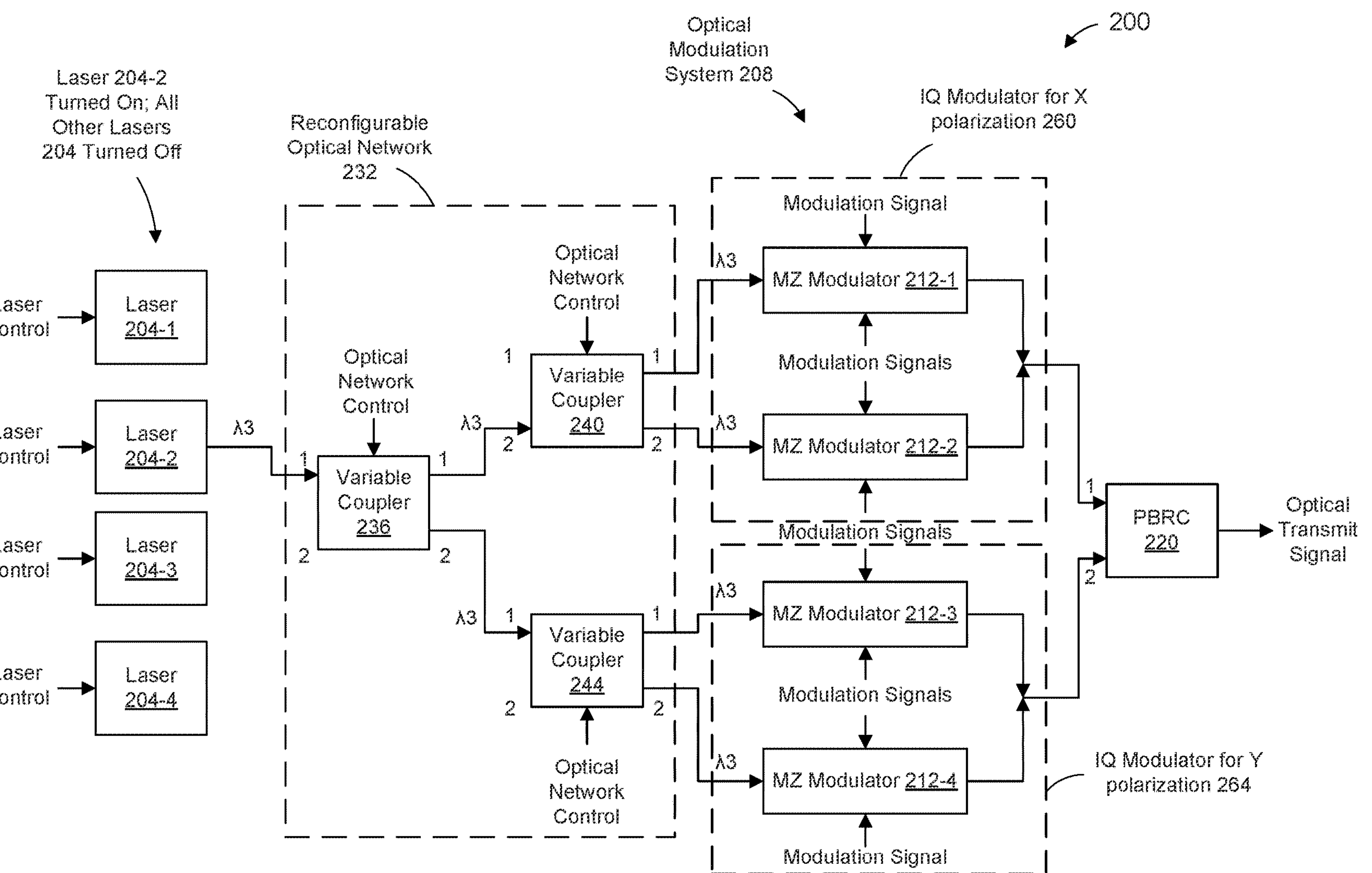
FIG. 2C is an illustration of the reconfigurable optical module of FIG. 2A in a second configuration in which the optical module is configured to generate signals modulated according to a second modulation technique, according to an embodiment.

FIG. 2C is a diagram of the optical module 200 of FIG. 2A configured to transmit data via a single wavelength (e.g., λ3) using coherent modulation, according to an embodiment. The laser control signals are set to turn on the laser 204-2 and to turn off the other lasers 204. Additionally, the optical network control signals are set to configure the variable couplers 236, 240, 244 so that the variable couplers 236, 240, 244 cross-couple light between the respective first input to the respective second output, and between the respective second input to the respective first output. As a result, the reconfigurable optical network 232 delivers light from the laser 204-3 to the optical inputs of all of the MZ modulators 212.

Additionally, modulator control signals (not shown) have configured the MZ modulators 212 for coherent modulation. For example, the modulator control signals have selected the operating point of the MZ modulators 212 to be the second modulator operating point (different than the first operating point) suitable for coherent modulation.

The MZ modulator 212-1 and the MZ modulator 212-2 act as a first IQ modulator 260 for an X polarization direction; and the MZ modulator 212-3 and the MZ modulator 212-4 act as a second IQ modulator 264 for a Y polarization direction. Further, a first IQ modulated signal from the first IQ modulator 260 are combined by the PBRC 220 with the second IQ modulated signal from the second IQ modulator 264. The optical transmit signal includes: i) the first IQ signal in a first polarization direction, and ii) the second IQ signal in a second polarization direction.

Figure 3:
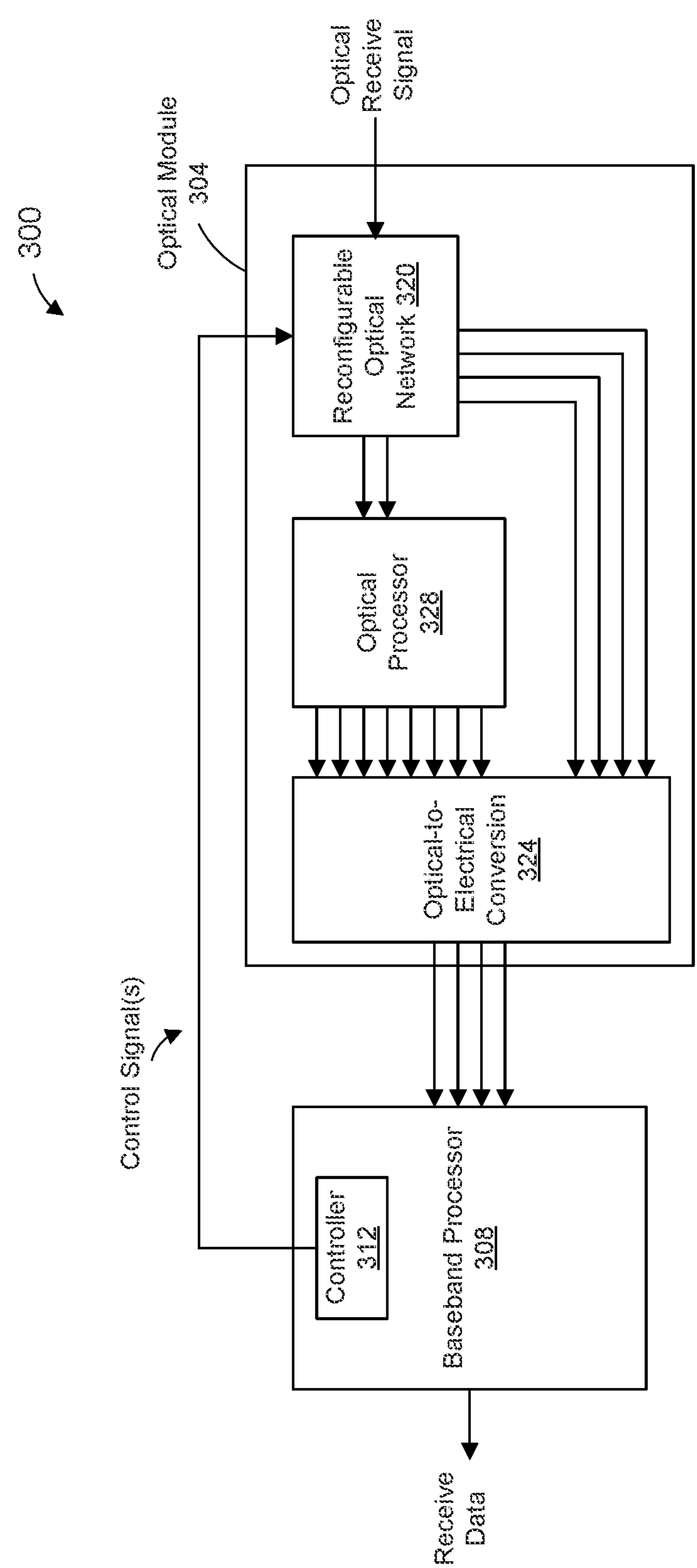
FIG. 3 is a simplified block diagram of an example optical receiver that is reconfigurable to process amplitude-modulated and coherent-modulated signals, according to an embodiment.

FIG. 3 is a simplified diagram of an example optical receiver 300 that is reconfigurable to process amplitude-modulated and coherent-modulated signals, according to an embodiment. In an embodiment, the optical transmitter 100 (FIG. 1) and the optical receiver 300 are included in a transceiver that is reconfigurable to generate and process amplitude-modulated and coherent-modulated signals. In other embodiments, the optical receiver 300 is included in a transceiver with a suitable reconfigurable optical transceiver different than the optical transmitter 100 of FIG. 1. Similarly, the optical transmitter 100 of FIG. 1 is included in a transceiver with another suitable reconfigurable receiver different than the optical receiver 300, in other embodiments.

The optical receiver 300 comprises an optical module 304 that is configured to i) receive an optical signal via an optical communication medium (not shown), ii) optically process the optical signal to generate a plurality of processed optical signals, and iii) generate a plurality of electrical signals based on the processed optical signals.

The optical receiver 300 also comprises a baseband processor 308 coupled to the optical module 304. The baseband processor 308 is configured to i) receive the plurality of electrical signals from the optical module 304, ii) convert the plurality of electrical signals to digital domain signals, iii) process the digital domain signals to recover receive data from the digital domain signals, and iv) output the receive data (e.g., to a host processor (not shown)).

The baseband processor 308 includes AFE circuitry (not shown) that is configured to convert the plurality of electrical signals from the optical module 304 to the digital domain signals. For example, the AFE includes one or more digital-to-analog converters (DACs) that are configured to convert the electrical signals from the optical module 304 to the digital domain signals.

The baseband processor 308 also includes a DSP (not shown) that is configured to perform various processing actions such as one or more of i) filtering (e.g., equalization) of the digital domain signals, ii) recovering information bits from the digital domain signals, iii) performing FEC decoding, etc.

The baseband processor 308 also comprises a controller 312 that is configured to generate one or more control signals for reconfiguring the optical module 304 for processing optical receive signals according to different demodulation techniques. In other embodiments, the controller 312 is external to the baseband processor 308. The controller 312 comprises a processor coupled to a memory, and the processor is configured to execute machine-readable instructions in the memory that, when executed by the processor, cause the controller 312 to generate the one or more control signals, according to an embodiment. Additionally or alternatively, the controller 312 comprises hardware circuitry (e.g., a hardware state machine) that additionally or alternatively causes the controller 112 to generate the one or more control signals, in another embodiment.

The optical module 304 comprises a reconfigurable optical network 320 that is optically coupled to optical-to-electrical conversion circuitry 324. The reconfigurable optical network 320 is also optically coupled to an optical processor 328. The optical processor 328 is also optically coupled to the optical-to-electrical conversion circuitry 324.

In an embodiment, the reconfigurable optical network 320 is configured to selectively, based on the one or more control signals from the controller 312, direct light corresponding to optical receive signal i) to the optical processor 328, or ii) to the optical-to-electrical conversion circuitry 324 in a manner that bypasses the optical processor 328. For example, in a first configuration of the optical module 304 the one or more control signals from the controller 312 control the reconfigurable optical network 320 to demultiplex multiple wavelengths of light in the optical receive signal and direct the demultiplexed light to the optical-to-electrical conversion circuitry 324 in a manner that bypasses the optical processor 328; whereas in a second configuration of the optical module 304 the one or more control signals from the controller 312 control the reconfigurable optical network 320 to split the optical receive signal into i) a first polarized optical signal polarized in a first direction and ii) a second polarized optical signal polarized in a second direction, and direct the first polarized optical signal and the second polarized optical signal to the optical processor 328.

In operation, when the optical signal includes data multiplexed on multiple wavelengths using intensity modulation, the one or more control signals from the baseband processor 308 control the reconfigurable optical network 320 to demultiplex multiple wavelengths of light in the optical receive signal and direct the demultiplexed light to the optical-to-electrical conversion circuitry 324 in a manner that bypasses the optical processor 328. The optical-to-electrical conversion circuitry 324 generates a plurality of electrical signals based on the demultiplexed light, and the baseband processor 308 processes the electrical signals to recover information bits based on intensity demodulation techniques.

On the other hand, when the optical signal corresponds to a dual-polarized coherent modulation, the one or more control signals from the baseband processor 308 control the reconfigurable optical network 320 to split the optical receive signal into i) a first polarized optical signal polarized in a first direction and ii) a second polarized optical signal polarized in a second direction, and direct the first polarized optical signal and the second polarized optical signal to the optical processor 328. The optical processor 328 performs optical processing on the first polarized optical signal and the second polarized optical signal to generate a plurality of processed optical signals. The optical-to-electrical conversion circuitry 324 generates a plurality of electrical signals based on the processed optical signals, and the baseband processor 308 processes the electrical signals to recover information bits based on coherent demodulation techniques.

Figure 4A:
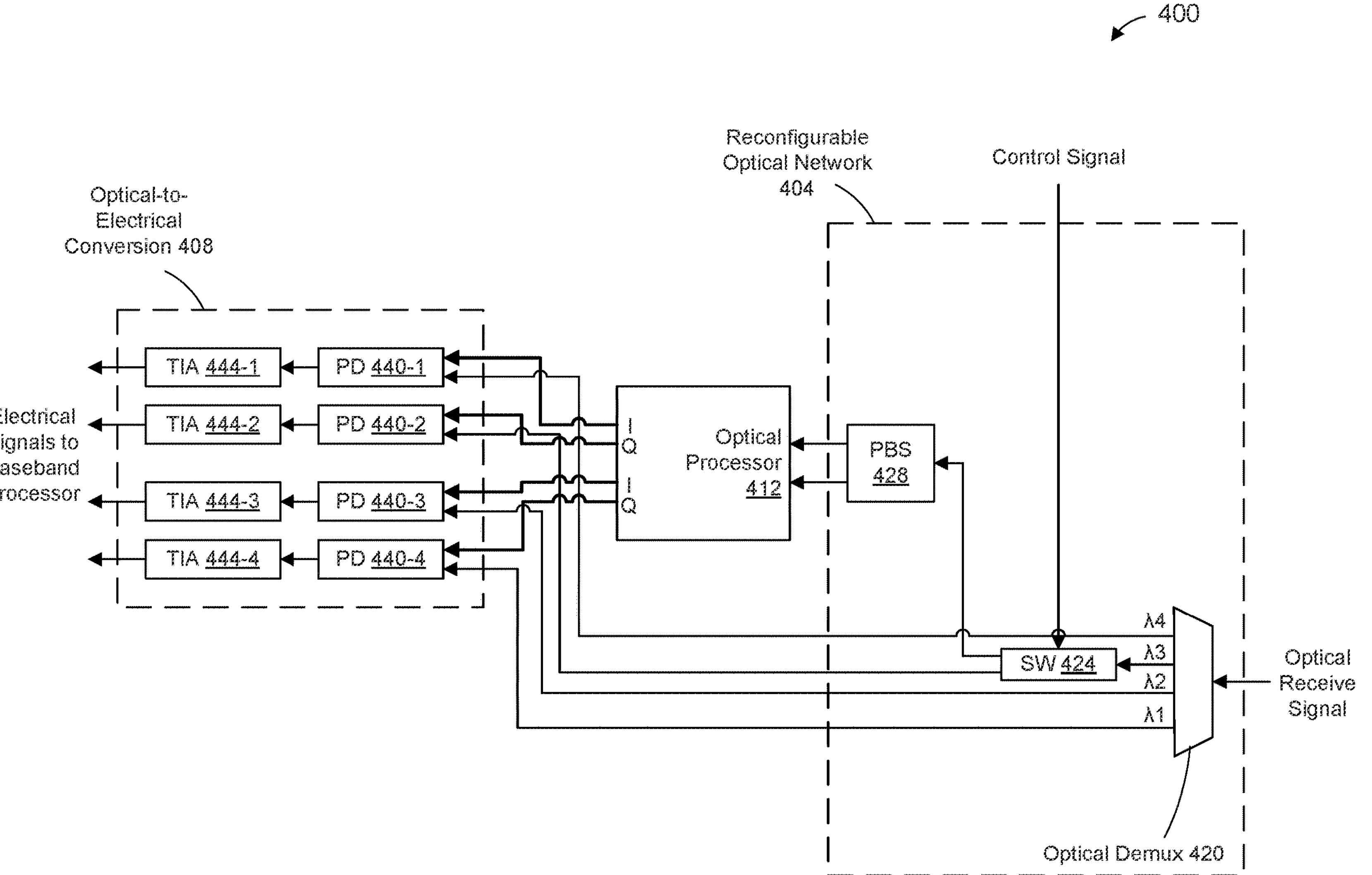
FIG. 4A is a simplified block diagram of a reconfigurable optical module used in the optical receiver of FIG. 3, according to an embodiment.

FIG. 4A is a simplified block diagram of an example optical module 400 that can be reconfigured to process an optical receive signal according to different demodulation techniques, according to an embodiment. The optical module 400 is used as the optical module 304 of FIG. 3, and FIG. 4A is described with reference to FIG. 3 for ease of explanation. In other embodiments, the optical module 400 is used in another suitable receiver different than the receiver 300 of FIG. 3. Similarly, the receiver 300 uses a suitable optical module different than the optical module 400, in some embodiments.

The optical module 400 comprises a reconfigurable optical network 404 that is optically coupled to optical-to-electrical conversion circuitry 408. The reconfigurable optical network 404 is also optically coupled to an optical processor 412. The optical processor 412 is also optically coupled to the optical-to-electrical conversion circuitry 408.

In an embodiment, the reconfigurable optical network 404 is configured to selectively, based on a control signals from a (e.g., the controller 312 (FIG. 3)), direct light corresponding to optical receive signal i) to the optical processor 412, or ii) to the optical-to-electrical conversion circuitry 408 in a manner that bypasses the optical processor 412. For example, in a first configuration of the optical module 404 the control signal controls the reconfigurable optical network 404 to demultiplex multiple wavelengths of light in the optical receive signal and direct the demultiplexed light to the optical-to-electrical conversion circuitry 408 in a manner that bypasses the optical processor 412; whereas in a second configuration of the optical module 404 the control signal controls the reconfigurable optical network 404 to split the optical receive signal into i) a first polarized optical signal polarized in a first direction and ii) a second polarized optical signal polarized in a second direction, and direct the first polarized optical signal and the second polarized optical signal to the optical processor 412.

The reconfigurable optical network 404 comprises an optical demultiplexer 420 that is configured to demultiplex multiple optical signals at respective wavelengths from light received an input of the optical demultiplexer 420, the multiple optical signals having been multiplexed at a transmitter. The demultiplexed optical signals are output via respective outputs of the optical demultiplexer 420. One of the outputs of the outputs of the optical demultiplexer 420 is optically coupled to an input of an optical switch 424, and the remaining outputs of the optical demultiplexer 420 are optically coupled to the optical-to-electrical conversion circuitry 408.

One of the outputs of the optical switch 424 is coupled to the optical-to-electrical conversion circuitry 408, and another output of the optical switch 424 is coupled to an input of a polarity beam splitter (PBS) 428. The optical switch 424 selectively provides the one output of the optical multiplexer 420 to either i) optical-to-electrical conversion circuitry 408, or ii) the PBS 438, depending on a state of the control signal.

The PBS 428 is configured to split an optical signal received at the input of the PBS 428 into a first output optical signal and a second output optical signal. The first output optical signal corresponds to light in the input signal that is polarized in a first direction, and the second output signal corresponds to light in the input optical signal that is polarized in a second direction different from the first direction. Outputs of the PBS 428 are coupled to inputs of the optical processor 412.

The optical processor 412 is configured to generate four pairs of outputs based on optical signals received from the PBS 428. The optical processor 412 comprises a plurality of optical couplers (e.g., 3 decibel (3 db) optical couplers) and one or more optical phase shifters. In some embodiments, the optical processor 412 comprises one or more optical delay lines. In some embodiments, the optical processor 412 is configured to optically mix the optical processor 412 is configured to optically mix a received optical signal with a delayed version of the optical signal.

Generally, the type of optical processor 412 depends on the type of optical modulation to be used and/or an amount of optical demodulation processing to be performed by the optical processor 412 versus an amount of demodulation processing to be performed by a baseband processor (e.g., the baseband processor 308 (FIG. 3)). In some embodiments, each optical processor 120 comprises a coherent intradyne dual polarization (2-Pol) 90-degree hybrid device. In other embodiments, each optical processor 120 comprises one or more delay line interferometers (DLIs). In some embodiments, each optical processor 120 comprises one or more Mach-Zehnder interferometers (MZIs).

In some embodiments in the optical processor 412 corresponds to a coherent intradyne dual polarization (2-Pol) 90-degree hybrid device, the coherent intradyne 2-Pol 90-degree hybrid device 412 is configured to optically mix the optical signals received from the PBS 428 with a local optical oscillator (not shown), and to generate four pairs of outputs based on optical signals received from the PBS 428. For instance, the coherent intradyne 2-Pol 90-degree hybrid device 412 is configured to generate a pair of in-phase (I) signals and pair of quadrature (Q) signals based on each output of the PBS 428. In some embodiments involving M-QAM or DQPSK demodulation, for example, the powers of signals output by the coherent intradyne 2-Pol 90-degree hybrid device 412 can be represented as:

$$P_{I,1}(t)=\frac{1}{4}|A(t)||A_{LO}|\cos(\omega_{if}t+\theta_{if}) \quad \text{(Equation 1)}$$

$$P_{I,2}(t)=-\frac{1}{4}|A(t)||A_{LO}|\cos(\omega_{if}t+\theta_{if}) \quad \text{(Equation 2)}$$

$$P_{Q,1}(t)=\frac{1}{4}|A(t)||A_{LO}|\sin(\omega_{if}t+\theta_{if}) \quad \text{(Equation 3)}$$

$$P_{Q,2}(t)=-\frac{1}{4}|A(t)||A_{LO}|\sin(\omega_{if}t+\theta_{if}) \quad \text{(Equation 4)}$$

where $P_{I,1}(t)$ is the optical power of a first I signal, $P_{I,2}(t)$ is the optical power of a second I signal, $P_{Q,1}(t)$ is the optical power of a first Q signal, $P_{Q,2}(t)$ is the optical power of a second Q signal, A(t) is the signal electric field from the PBS 428, $A_{LO}(t)$ is a local oscillator laser electric field. $\omega_{if}$ and $\theta_{if}$ is the frequency and phase difference between A and $A_{LO}$, respectively.

In some embodiments in which each optical processor 412 corresponds to one or more DLIs, the outputs of each PBS 428 are coupled to a corresponding set of one or more DLIs 428. The set of one or more DLIs 428 is configured to generate four pairs of outputs based on optical signals received from the PBS 428. For instance, the DLI 412 is configured to generate a pair of I signals and pair of Q signals based on each output of the PBS 428. In an embodiment involving DQPSK demodulation, the powers of signals output by the DLI 412 can be represented as:

$$P_{I,1}(t)=\frac{1}{4}|A(t)+A(t-T_s)|^2 \quad \text{(Equation 5)}$$

$$P_{I,2}(t)=-\frac{1}{4}|A(t)-A(t-T_s)|^2 \quad \text{(Equation 6)}$$

$$P_{Q,1}(t)=\frac{1}{4}|A(t)+A(t-T_s)|^2 \quad \text{(Equation 7)}$$

$$P_{Q,2}(t)=-\frac{1}{4}|A(t)-A(t-T_s)|^2 \quad \text{(Equation 8)}$$

where $P_{I,i}(t)$ is the optical power of a first I signal, $P_{I,2}(t)$ is the optical power of a second I signal, $P_{Q,1}(t)$ is the optical power of a first Q signal, $P_{Q,2}(t)$ is the optical power of a second Q signal, A(t) is the signal from the PBS 428, and $T_s$ is a symbol delay.

The optical-to-electrical conversion circuit 408 comprises multiple instances of a respective photodiode circuit 440 coupled to a respective transimpedance amplifier (TIA) 444. As will be described further below, each photodiode circuit 440 is configured to convert one or more optical signals into a current signal, and the corresponding TIA 444 is configured to convert the current signal into a voltage signal, according to an embodiment.

The optical-to-electrical conversion circuit 408 is configured to process optical signals that are modulated according to multiple different optical modulation techniques. As can be seen from FIG. 4A, each of the photodiode circuits 440 is optically coupled to both i) a respective output of the optical demultiplexer 420 and ii) respective outputs of the optical processor 412. As will be described further below, each of the photodiode circuits 440 includes a multiple-input photodiode that is configured to receive both i) a respective output of the optical demultiplexer 420 and ii) respective outputs of the optical processor 412.

As will be described further below, when the optical module 400 is in a first configuration, each of the photodiode circuits 440 receives a respective intensity modulated signal from the optical demultiplexer 420; and when the optical module 400 is in a second configuration, each of the photodiode circuits 440 receives a set of optical signals from the optical processor 412.

When the optical module 400 is in the first configuration, each of the photodiode circuits 440 is configured to generate a current signal that corresponds to an intensity modulated signal from the optical demultiplexer 420. When the optical module 400 is in the second configuration, each pair of photodiode circuit 440 and TIA 444 is configured to generate a voltage signal that corresponds to a subtraction of either i) a corresponding pair of I signals (e.g., Equations 1 and 2, or Equations 5 and 6), or ii) a corresponding pair of Q signals (e.g., Equations 3 and 4, or Equations 7 and 8), according to an embodiment.

Figure 4B:
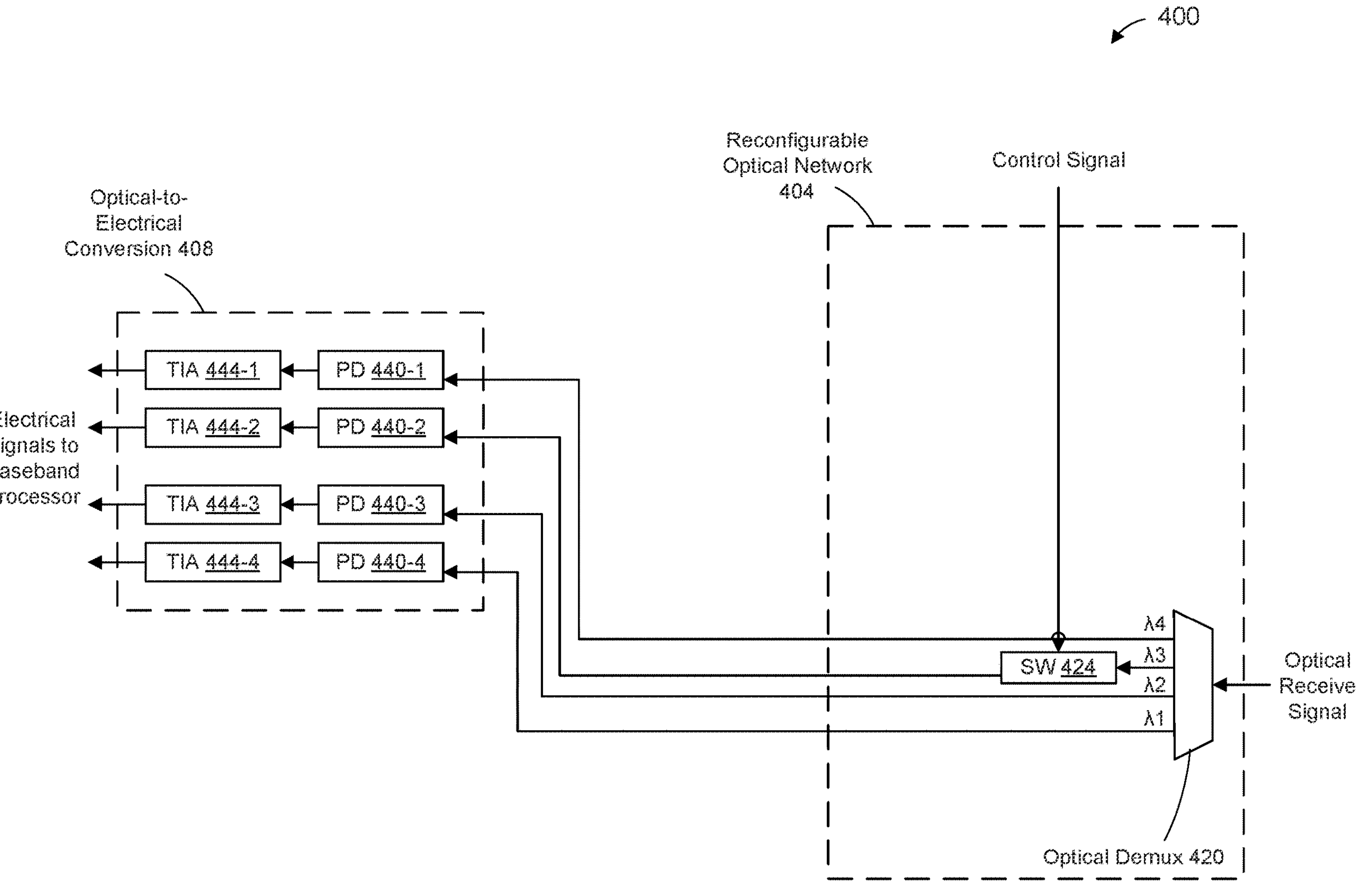
FIG. 4B is an illustration of the reconfigurable optical module of FIG. 4A in a first configuration in which the optical module is configured to receive and process signals modulated according to a first modulation technique, according to an embodiment.

FIG. 4B is an illustration of the optical module 400 in a first configuration in which the optical module 400 is configured to receive intensity-modulated signals multiplexed on multiple wavelengths, according to an embodiment.

The optical demultiplexer 420 demultiplexes the optical receive signal input into four outputs. One of the outputs is provided to the optical switch 424, whereas the three remaining outputs of the demultiplexer are provided to respective photodiode circuits 440. In the first configuration, the control signal provided to the optical switch 424 controls the optical switch 424 to direct the one output of the demultiplexer to photodiode circuit 440-2. As a result, the PBS 428 (FIG. 4A) does not receive an optical signal. Thus, the PBS 428 does not provide any optical signals to the optical processor 412 (FIG. 4A), and the optical processor 412 does not provide any optical signals to the photodiode circuits 440. Accordingly, the PBS 428 and the optical processor 412 are not illustrated in FIG. 4B to help show the paths of optical signals through the optical module 400 while in the first configuration.

Each of the photodiode circuits 440 generates a respective current signal that corresponds to an intensity-modulated signal from a respective output of the optical demultiplexer 420. The TIAs 444 generate respective voltage signals based on the current signals from the photodiode circuits 440.

Figure 4C:
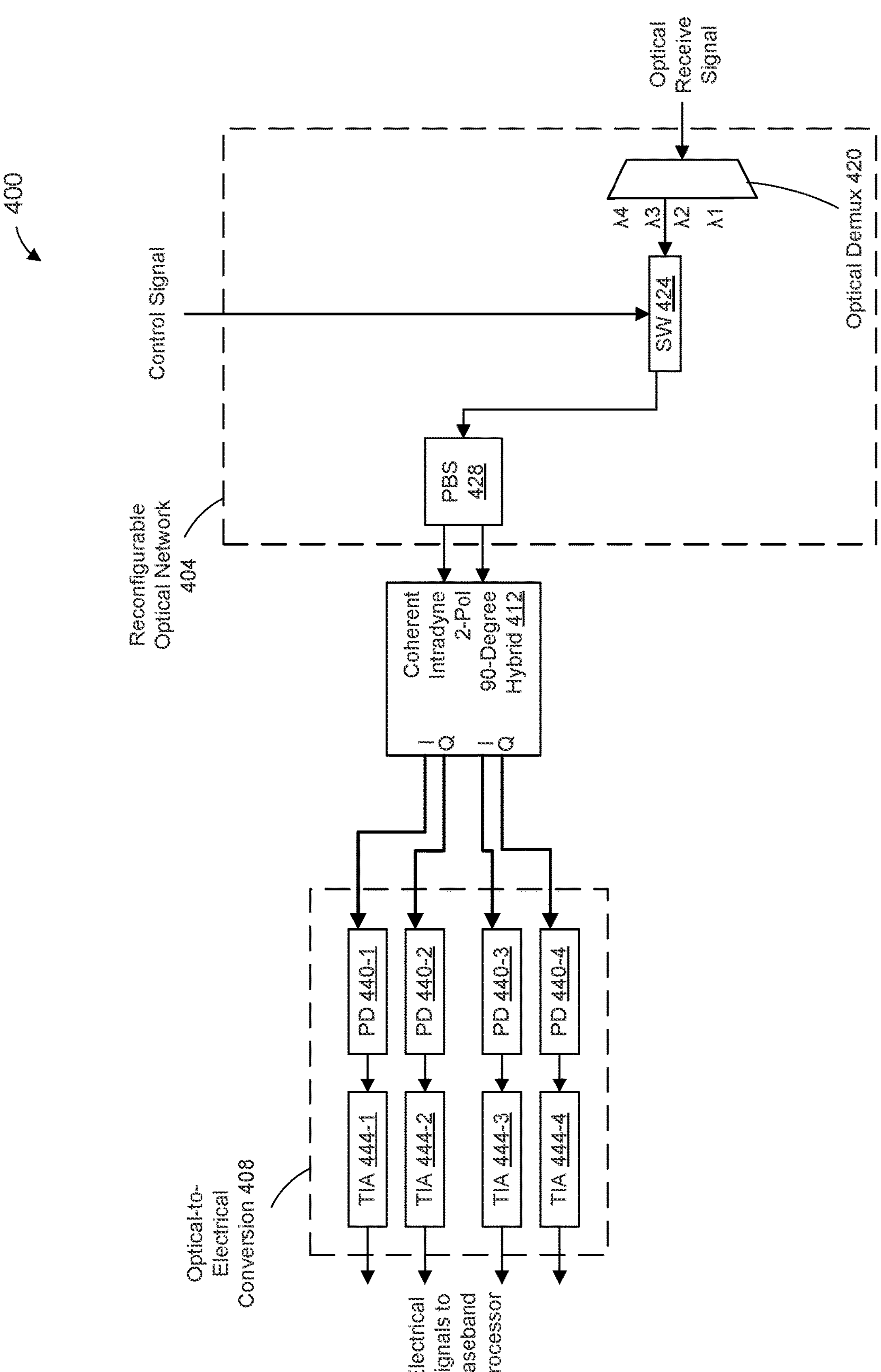
FIG. 4C is an illustration of the reconfigurable optical module of FIG. 4A in a second configuration in which the optical module is configured to generate signals modulated according to a second modulation technique, according to an embodiment.

FIG. 4C is an illustration of the optical module 400 in a second configuration in which the optical module 400 is configured to receive and demodulate dual-polarity DQPSK signals or M-QAM signals, according to an embodiment. In the embodiment of FIG. 4C, the optical processor 412 corresponds to a coherent intradyne 2-Pol 90-degree hybrid device 412. The DQPSK-modulated or M-QAM signals are modulated on the λ3 wavelength.

Because the optical receive signal only includes the λ3 wavelength, three outputs of the optical demultiplexer 420 have no signal, and the output of the optical demultiplexer 420 corresponding to the λ3 wavelength is provided to the optical switch 424. In the second configuration, the control signal provided to the optical switch 424 controls the optical switch 424 to direct the λ3 wavelength output of the demultiplexer to the PBS 428.

The PBS 428 splits an input optical signal into a first output optical signal (corresponding to light polarized in a first direction) and a second output optical signal (corresponding to light polarized in a second direction), and the coherent intradyne 2-Pol 90-degree hybrid device 412 receives the first optical signal and the second optical signal. The coherent intradyne 2-Pol 90-degree hybrid device 412 generates a pair of I signals and a pair of Q signals based on each output of the PBS 428, as discussed above.

Each photodiode circuit 440 receives a corresponding pair of I signals (e.g., Equations 1 and 2), or ii) a corresponding pair of Q signals (e.g., Equations 3 and 4), and each photodiode circuit 440/TIA 444 pair generates a voltage signal that corresponds to a subtraction of i) the corresponding pair of I signals, or ii) the corresponding pair of Q signals.

Figure 4D:
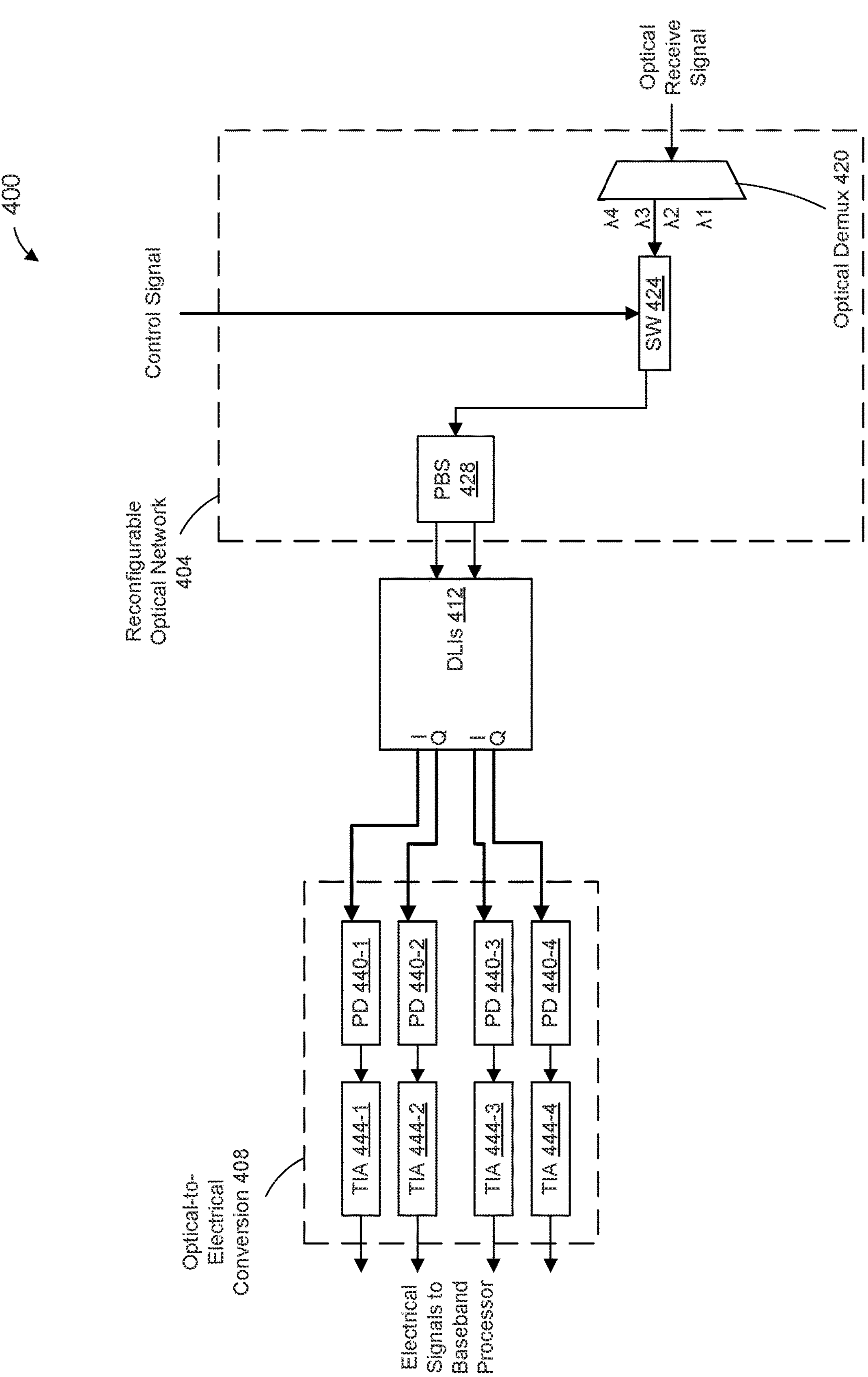
FIG. 4D is an illustration of the reconfigurable optical module of FIG. 4A in a second configuration in which the optical module is configured to generate signals modulated according to a second modulation technique, according to another embodiment.

FIG. 4D is an illustration of the optical module 400 in the second configuration in which the optical receiver 100 is configured to receive and demodulate multiple DQPSK signals, according to another embodiment. In the embodiment of FIG. 1D, each optical processor 412 corresponds to a set of one or more DLIs.

In the embodiment of FIG. 4D, more of the demodulation processing is performed in the DLIs 412 (optical processors 412) and therefore less demodulation processing need be performed by the baseband processor as compared to the embodiment of FIG. 4C. In an embodiment, a polarization controller (PC) is coupled between the optical switch 424 and the input of the PBS 428.

FIG. 5A is a simplified diagram of an example optical-to-electrical conversion circuit 500 for use with reconfigurable optical receivers such as the optical receiver 300 of FIG. 3 and reconfigurable optical modules such as the reconfigurable optical module 400 of FIG. 4A, according to an embodiment. The optical-to-electrical conversion circuit 500 is described with reference to FIG. 4A for ease of explanation. In some embodiments, the optical-to-electrical conversion circuit 500 is used in a suitable reconfigurable optical module different than the reconfigurable optical module 400 of FIG. 4A. Similarly, the optical module 400 uses a suitable optical-to-electrical conversion circuit that is different than the optical-to-electrical conversion circuit 500 of FIG. 5A.

In an embodiment, the optical-to-electrical conversion circuit 500 is used for each of i) the photodiode circuitry 444-1 and the TIA 444-1, ii) the photodiode circuitry 440-2 and the TIA 444-2, iii) the photodiode circuitry 440-3 and the TIA 444-3, and iv) the photodiode circuitry 440-4 and the TIA 444-4.

The optical-to-electrical conversion circuit 500 comprises a photodiode circuit 504 coupled to a TIA 508. The photodiode circuit 504 comprises a photodiode 512 and a multiple-input photodiode 516. The photodiode 512 comprises an anode 520 and a cathode 524, and the multiple-input photodiode 516 comprises an anode 528 and a cathode 532. The multiple-input photodiode 516 is coupled in series with the photodiode 512. For example, the cathode 532 of the multiple-input photodiode 516 is coupled to the anode 520 of the photodiode 512. In an embodiment, the anode 528 is coupled to ground.

The photodiode circuit 504 also comprises bias circuitry 540 that is configured to apply a reverse bias across the photodiode 512 and the multiple-input photodiode 516.

The TIA 508 comprises an operational amplifier 544 and an impedance 548 that is coupled between an input of the operational amplifier 544 and an output of the operational amplifier 544. In an embodiment, the impedance 548 is a suitable resistance. In an embodiment, the operational amplifier 544 comprises an additional input (not shown) coupled to ground.

In other embodiments, the TIA 508 comprises other suitable circuitry (e.g., that does not include an operational amplifier and/or does not include an impedance coupled between an input of the operational amplifier and an output of the operational amplifier) configured to convert a current signal to a voltage signal. As merely an illustrative example, the TIA 508 comprises a common gate/common base amplifier.

In other embodiments, the photodiode circuit 504 comprises another suitable arrangement of the photodiode 512 and the multiple-input photodiode 516. For example, in some embodiments, the cathode 532 of the multiple-input photodiode 516 is not coupled to the anode 520 of the photodiode 512. In some such embodiments, each of the photodiode 512 and the multiple-input photodiode 516 is coupled to respective inputs of another suitable TIA and/or to respective inputs of respective TIAs.

The photodiode circuit 504 includes a node 560 coupled between the photodiode 512 and the multiple input photodiode 516, and also coupled to the input of the operational amplifier 544. The node 560 outputs a current to the operational amplifier 544 that is a sum of i) current flowing from the anode 520 and ii) current flowing from the cathode 532. In other words, the node 560 outputs a current to the operational amplifier 544 that is a difference of i) current flowing from the anode 520 and ii) current flowing into the cathode 532.

In an embodiment, the node 560 comprises a connection between the anode 520 and the cathode 532. In other embodiments, the node 560 comprises one or more passive components (not shown). For example, the node 560 comprises a first resistor (not shown) in series with the photodiode 512 and a second resistor (not shown) in series with the multiple-input photodiode 516. In other embodiments, the node comprises one or more active components (not shown). For example, the node 560 comprises one or more transistors (not shown) arranged to act as an amplifier and/or buffer between i) the photodiode 512 and the multiple-input photodiode 516, and ii) the TIA 508.

In operation, when an optical signal illuminates the photodiode 512, a current flowing out of the anode 520 increases with the intensity of light illuminating the photodiode 512. Similarly, when an optical signal illuminates the multiple-input photodiode 516, a current flowing into the cathode 532 increases with the intensity of light illuminating the multiple-input photodiode 516. Additionally, as discussed above, current output by the node 560 corresponds to a difference of i) current flowing from the anode 520 and ii) current flowing into the cathode 532. The TIA 508 acts to convert the current signal output by the node 560 to a voltage signal.

In the example of FIG. 5A, the multiple-input photodiode 516 is configured to receive three optical signals. In other embodiments, the multiple-input photodiode 516 is configured to receive two optical signals. For example, in an embodiment in which the optical-to-electrical conversion circuit 500 is used for the photodiode circuitry 440-1 and the TIA 444-1, the multiple-input photodiode 516 receives a first optical signal from the optical demultiplexer 420 and a second optical signal from the optical processor 412.

In an embodiment, the multiple-input photodiode 516 comprises a front side and a back side that is opposite the front side; and the multiple-input photodiode 516 is configured so that when light illuminates the front side a current flowing into the cathode 532 increases with the intensity of light illuminating the front side, and when light illuminates the back side the current flowing into the cathode 532 increases with the intensity of light illuminating the back side. In such embodiments, the optical-to-electrical conversion circuit 500 (and/or an optical module that includes the optical-to-electrical conversion circuit 500) is configured to direct light from a first source to the front side and to direct light from a second source to the back side. For example, the optical-to-electrical conversion circuit 500 (and/or an optical module that includes the optical-to-electrical conversion circuit 500) is configured to direct to the front side light from one of the optical demultiplexer 420 and the optical processor 412, and to direct to the back side light from another one of the optical demultiplexer 420 and the optical processor 412.

In another embodiment, the multiple-input photodiode 516 additionally or alternatively comprises an active region on one side of the multiple-input photodiode 516 having a size configured to accommodate receiving optical signals from multiple sources. For example, the size of the active region is configured to accommodate receiving optical signals from at least the optical demultiplexer 420 and the optical processor 412. In an embodiment, the size of the active region of the multiple-input photodiode 516 is substantially larger (i.e., at least 20% larger) than a size of an active region of the photodiode 512. In other embodiments, the size of the active region of the multiple-input photodiode 516 is not substantially larger than the size of the active region of the photodiode 512.

Referring now to FIGS. 4A and 5A, in an embodiment, the optical processor 412 is optically coupled to the photodiode 512 via a waveguide that guides light from an output of the optical processor 412 to the multiple-input photodiode 516. In another embodiment, the optical processor 412 is optically coupled to the photodiode 512 via a fiber optic cable that guides light from an output of the optical processor 412 to the photodiode 512. In another embodiment, the photodiode 512 receives light from an output of the optical processor 412 via free space.

In an embodiment, the optical demultiplexer 420 is optically coupled to the multiple-input photodiode 516 via a first waveguide that guides light from an output of the optical demultiplexer 420 to the multiple-input photodiode 516; and an output of the optical processor 412 is optically coupled to the multiple-input photodiode 516 via a second waveguide that guides light from an output of the optical processor 412 to the multiple-input photodiode 516. In some such embodiments, the first waveguide guides light from the output of the optical demultiplexer 420 to one of the front side of the multiple-input photodiode 516 and the back side of the multiple-input photodiode 516; and the second waveguide guides light from the output of the optical processor 412 to another one of the front side of the multiple-input photodiode 516 and the back side of the multiple-input photodiode 516. In other such embodiments, the active region on one side of the multiple-input photodiode 516 has a size configured to accommodate receiving light from the first waveguide and receiving light from the second waveguide.

In another embodiment, the optical demultiplexer 420 is optically coupled to the multiple-input photodiode 516 via a first fiber optic cable that guides light from an output of the optical demultiplexer 420 to the multiple-input photodiode 516; and the optical processor 412 is optically coupled to the multiple-input photodiode 516 via a second fiber optic cable that guides light from an output of the optical processor 412 to the multiple-input photodiode 516. In some such embodiments, the first fiber optic cable guides light from the output of the optical demultiplexer 420 to one of the front side of the multiple-input photodiode 516 and the back side of the multiple-input photodiode 516; and the second fiber optic cable guides light from the output of the optical processor 412 to another one of the front side of the multiple-input photodiode 516 and the back side of the multiple-input photodiode 516. In other such embodiments, the active region on one side of the multiple-input photodiode 516 has a size configured to accommodate receiving light from the first fiber optic cable and receiving light from the second fiber optic cable.

In another embodiment, the multiple-input photodiode 516 receives light from an output of the optical demultiplexer 420 via free space, and receives light from an output of the optical processor 412 via free space. In some such embodiments, optical-to-electrical conversion circuitry 500 and/or the optical module (e.g., the optical module 304, the optical module 400, etc.) is configured: i) to direct light via free space from the output of the optical demultiplexer 420 to one of the front side of the multiple-input photodiode 516 and the back side of the multiple-input photodiode 516; and ii) direct light via free space from the output of the optical processor 412 to another one of the front side of the multiple-input photodiode 516 and the back side of the multiple-input photodiode 516. In other such embodiments, the active region on one side of the multiple-input photodiode 516 has a size configured to accommodate receiving light from the optical demultiplexer 420 via free space and receiving light from the output of the optical processor 412 via free space.

In other embodiments, the multiple-input photodiode 516 receives light from an output of the optical demultiplexer 420 via one of a waveguide, a fiber optic cable, free space, etc., and receives light from an output of the optical processor 412 via another one of a waveguide, a fiber optic cable, free space, etc. In some such embodiments, light from the optical demultiplexer 420 is directed to one of the front side of the multiple-input photodiode 516 or the back side of the multiple-input photodiode 516, and light from the optical processor 412 is directed to another one of the front side of the multiple-input photodiode 516 or the back side of the multiple-input photodiode 516. In some other such embodiments, the active region on one side of the multiple-input photodiode 516 has a size configured to accommodate receiving light from the optical demultiplexer 420 via the one of a waveguide, a fiber optic cable, free space, etc., and receiving light from the output of the optical processor 412 via the other one of a waveguide, a fiber optic cable, free space, etc.

The different optical signals that the multiple-input photodiode 516 is configured to receive correspond to different modulation techniques. For example, in the optical receiver 300, the one of the optical signals that the multiple-input photodiode 516 is configured to receive corresponds to an intensity-modulated optical signal, and another one of the optical signals that the multiple-input photodiode 516 is configured to receive corresponds to a coherent-modulated signal.

FIG. 5B is a diagram of the optical-to-electrical conversion circuit 500 of FIG. 5A operating when the optical receiver 300 is operating in the first configuration, such as described above with reference to FIGS. 3, 4A, and 4B, according to an embodiment. For example, when the optical-to-electrical conversion circuit 500 is used as the photodiode circuit 440-1 and the TIA 444-1, the multiple-input photodiode 516 does not receive an optical signal from the optical processor 412. Rather, the multiple-input photodiode 516 receives an optical signal (e.g., an IMDD signal) from the optical demultiplexer 420. Additionally, the photodiode 512 does not receive an optical signal from the optical processor 412. Thus, the current signal output from the node 560 reflects variations in the intensity of light in the IMDD signal from the optical demultiplexer 420. The TIA 508 converts this current signal to a voltage signal.

Figure 5C:
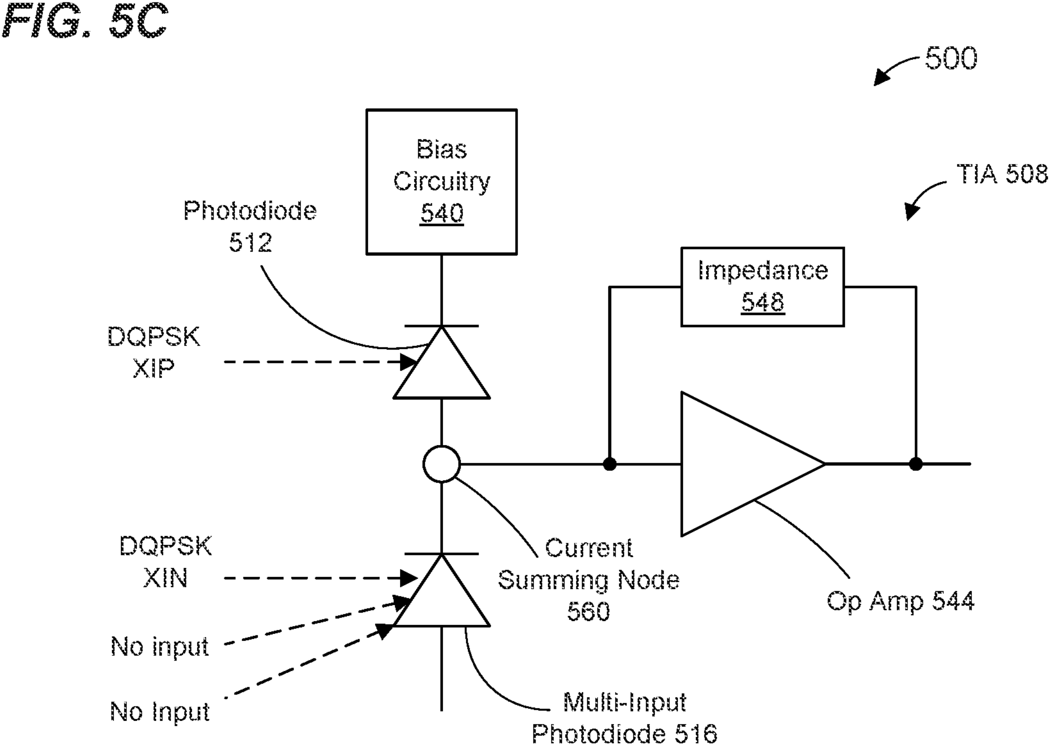
FIG. 5C is a diagram of the optical-to-electrical conversion circuit of FIG. 5A operating when the optical receiver is operating in the second configuration corresponding to FIG. 4C, according to an embodiment.

FIG. 5C is a diagram of the optical-to-electrical conversion circuit 500 of FIG. 5A operating when the optical receiver 300 is operating in the second configuration, such as described above with reference to FIGS. 3, 4A, 4C, and 4D, according to an embodiment. For example, when the optical-to-electrical conversion circuit 500 is used as the photodiode circuit 440-1 and the TIA 444-1 of FIG. 4C, the photodiode 512 receives a first optical signal (e.g., a first DQSPK signal) from the optical processor 412, such as an optical signal corresponding to Equation 1. Additionally, the multiple-input photodiode 516 does not receive an optical signal from the optical demultiplexer 420. Rather, the multiple-input photodiode 516 receives a second optical signal (e.g., a second DQSPK signal) from the optical processor 412, such as an optical signal corresponding to Equation 2. Thus, the current signal output from the node 560 corresponds to a difference of i) current flowing from the anode 520 due to the first optical signal and ii) current flowing into the cathode 532 due to the second optical signal.

When the first optical signal corresponds to Equation 1 and the second optical signal corresponds to Equation 2, the current signal output from the node 560 is proportional to:

$$P_{I,1}(t)-P_{I,2}(t)=\tfrac{1}{2}|A(t)||A_{LO}|\cos(\omega_{if}t+\theta_{if}) \quad \text{(Equation 9)}$$

The TIA 444 converts the current signal output by the node 560 to a voltage signal.

As another example, when the optical-to-electrical conversion circuit 500 is used as the photodiode circuit 440-1 and the TIA 444-1 of FIG. 4D, the photodiode 512 receives a first optical signal (e.g., a first DQSPK signal) from the set of DLIs 412, such as an optical signal corresponding to Equation 5. Additionally, the multiple-input photodiode 516 does not receive an optical signal from the optical demultiplexer 420. Rather, the multiple-input photodiode 516 receives a second optical signal (e.g., a second DQSPK signal) from the set of DLIs 412, such as an optical signal corresponding to Equation 6. Thus, the current signal output from the node 560 corresponds to a difference of i) current flowing from the anode 520 due to the first optical signal and ii) current flowing into the cathode 532 due to the second optical signal.

When the first optical signal corresponds to Equation 5 and the second optical signal corresponds to Equation 6, the current signal output from the node 560 is proportional to:

$$P_{I,1}(t)-P_{I,2}(t)=A(t)A(t-T_s) \quad \text{(Equation 10)}$$

where A(t) equals:

$$A(t)=\mathrm{sqrt}(P_0)\exp[i\varphi(t)] \quad \text{(Equation 11)}$$

Where $P_0$ is a constant and φ(t) is the phase of the optical signal. Then, the current signal output from the node 560 is proportional to:

$$P_{I,1}(t)-P_{I,2}(t)=\cos(\Delta\varphi) \quad \text{(Equation 12)}$$

where Δφ(t)=φ(t)−φ(t−Ts), and is 0 or π depending on the bit transmitted.

The TIA 444 converts the current signal output by the node 560 to a voltage signal. In DQPSK, Δφ=0 or π depending on the bit transmitted, and the DSP of the baseband processor 308 can reconstruct the original bit stream from the output of the TIA 444.

Figure 5D:
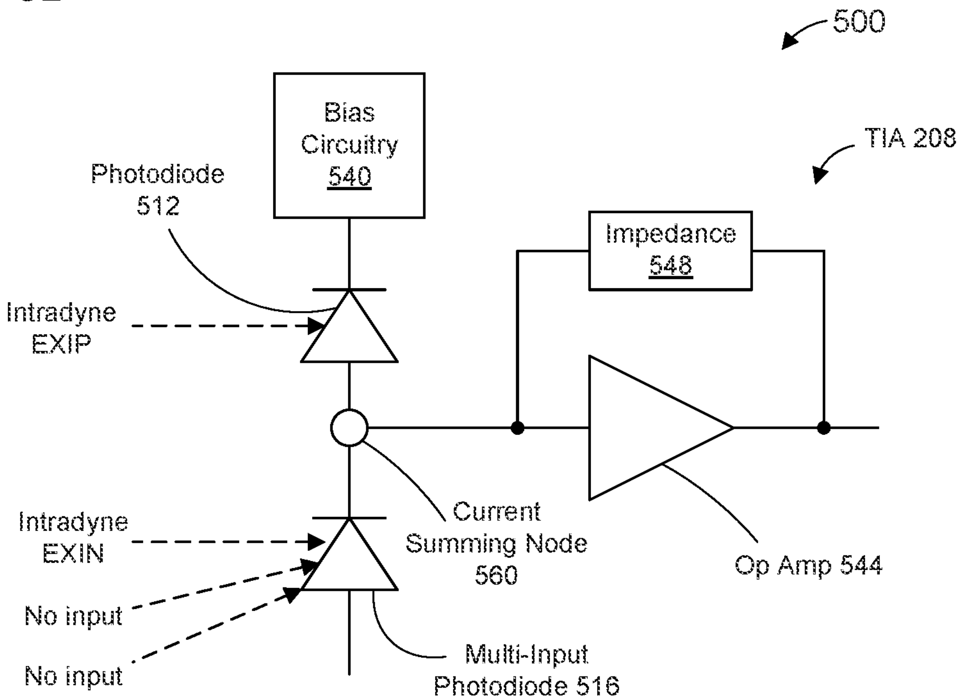
FIG. 5D is a diagram of the optical-to-electrical conversion circuit of FIG. 5A operating when the optical receiver is operating in another configuration, according to an embodiment.

FIG. 5D is a diagram of the optical-to-electrical conversion circuit 500 of FIG. 5A operating when the optical receiver 100 is operating in the configuration corresponding to intradyne M-QAM demodulation, according to an embodiment. Referring again to FIGS. 3 and 4A, with intradyne M-QAM demodulation, the optical processor 412 comprises a coherent intradyne 2-pol 90-degree hybrid 412, which mixes optical signals from the PBS 428 with a local oscillator signal (not shown) as part of generating the output signals. When the optical-to-electrical conversion circuit 500 is used as the photodiode circuit 440-1 and the TIA 444-1, the photodiode 512 receives a first optical signal (e.g., a first intradyne M-QAM signal) from the coherent intradyne 2-pol 90-degree hybrid 412, such as an optical signal corresponding to Equation 1. Additionally, the multiple-input photodiode 516 does not receive an optical signal from the optical demultiplexer 420. Rather, the multiple-input photodiode 516 receives a second optical signal (e.g., a second intradyne M-QAM signal) from the coherent intradyne 2-pol 90-degree hybrid 412, such as an optical signal corresponding to Equation 2. Thus, the current signal output from the node 560 corresponds to a difference of i) current flowing from the anode 520 due to the first optical signal and ii) current flowing into the cathode 532 due to the second optical signal.

When the first optical signal corresponds to Equation 1 and the second optical signal corresponds to Equation 2, the current signal output from the node 560 is proportional to Equation 9. The TIA 508 converts the current signal output by the node 560 to a voltage signal.

Figure 6:
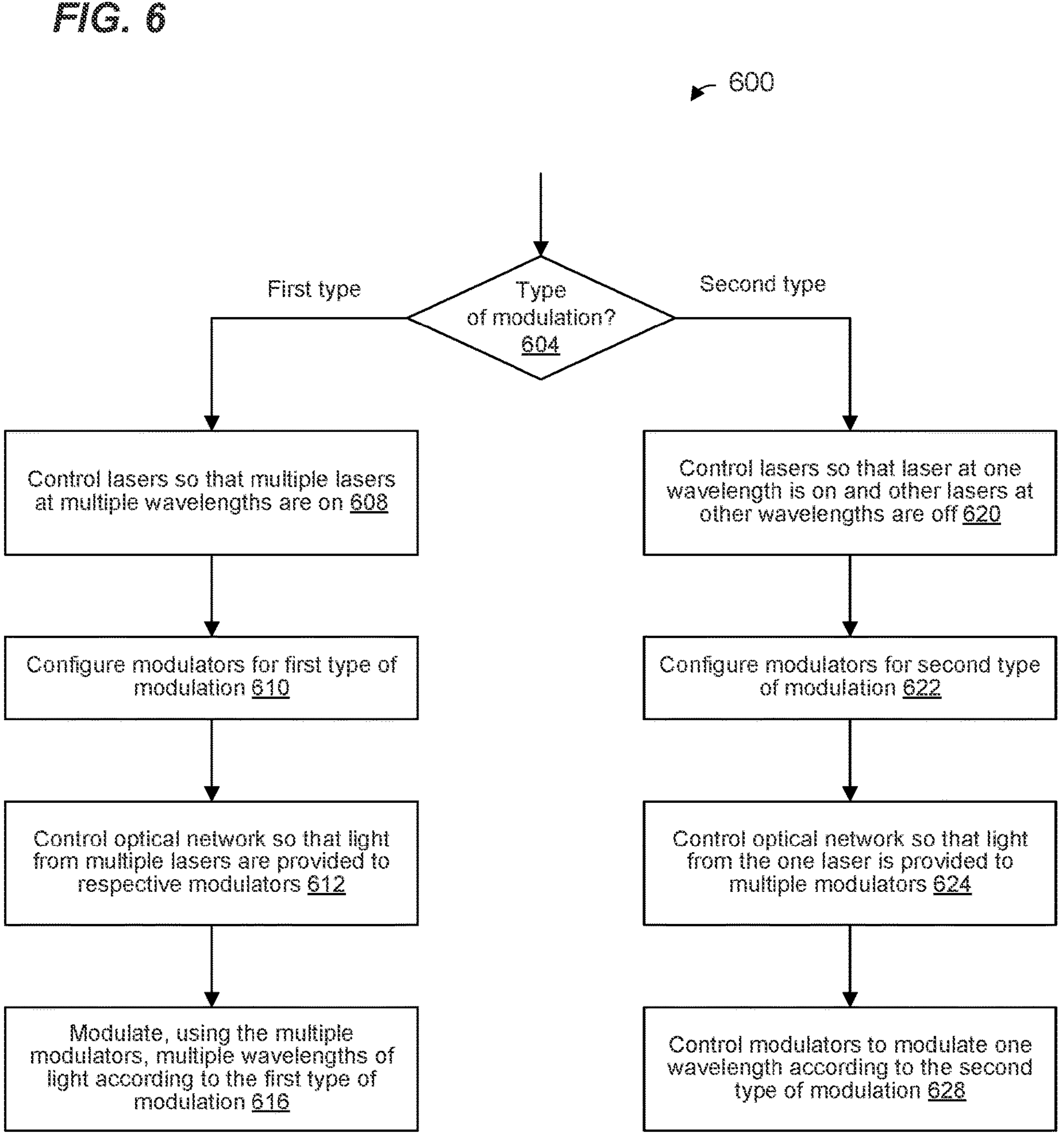
FIG. 6 is a flow diagram of an example method for operating a reconfigurable optical transmitter that is capable of modulating optical signals according to different optical modulation techniques, according to an embodiment.

FIG. 6 is a flow diagram of an example method 600 for operating a reconfigurable optical transmitter that is capable of modulating optical signals according to different optical modulation techniques, according to an embodiment. The method 600 is implemented by the reconfigurable optical transmitter of FIG. 1 and/or using the optical module 200 of FIG. 2A, in some embodiments. FIG. 6 is described with reference to FIGS. 1 and 2A for explanatory purposes. In other embodiments, the method 600 is implemented using another suitable reconfigurable optical receiver different than the reconfigurable optical receiver of FIG. 1 and/or using another suitable optical module different than the optical module 200 of FIG. 2A.

At block 604, a type of modulation that the reconfigurable optical transmitter is to use is determined. The reconfigurable optical transmitter is capable of modulating optical signals according to a plurality of different types of optical modulation techniques, including at least a first type and a second type. In an embodiment, the first type corresponds to intensity-modulation in which a plurality of signals are modulated on different wavelengths, and the second type involves coherent modulation on a single wavelength, in an embodiment. For example, the first type corresponds to IMDD modulation, and the second type corresponds to DQPSK or M-QAM, in an illustrative embodiment.

In an embodiment, the controller of the optical receiver 100 determines the type of modulation at block 704. In another embodiment, the controller 112 of the optical transmitter 100 determines the type of modulation at block 604.

In response to determining at block 604 that the reconfigurable optical transmitter is to use the first type of modulation, the flow proceeds to block 608. At block 608, a controller of the optical transmitter controls multiple lasers of the optical transmitter so that the multiple lasers are turned on. In an embodiment, the multiple lasers correspond to respective wavelengths. For example, the controller 112 controls the lasers 120/204 so that all of the lasers 120/204 are turned on.

At block 610, the controller configures optical modulators of the optical transmitter for the first type of modulation. For example, the controller 112 sets a modulator operating point of the MZ modulators 212 to a first modulator operating suitable for the first type of modulation.

At block 612, the controller of the optical transmitter controls a reconfigurable optical network of the optical transmitter so that light from the multiple lasers are provided to respective modulators of the optical transmitter. For example, the controller 112 controls the reconfigurable optical network 124/232 so that light from the multiple lasers 120/204 are provided to respective modulators 128/212 of the optical transmitter.

At block 616, the multiple modulators modulate respective data onto multiple wavelengths according to the first type of modulation. In an embodiment, the baseband processor 104 generates modulation signals, which are used to control the multiple modulators 128/212 to modulate respective data onto multiple wavelengths according to the first type of modulation. In an embodiment, modulating respective data onto multiple wavelengths at block 616 comprises receiving at driver circuitry 132 modulation signals from the baseband processor 104 and controlling the multiple modulators with the driver circuitry 132 based on the modulation signals from the baseband processor 104.

On the other hand, in response to determining at block 604 that the reconfigurable optical transmitter is to use the second type of modulation, the flow proceeds to block 620. At block 620, the controller of the optical transmitter controls the multiple lasers of the optical transmitter so that one laser is turned on and other lasers are turned off. In an embodiment in which the multiple lasers correspond to respective wavelengths, the controller of the optical transmitter controls the multiple lasers of the optical transmitter so that one laser at one wavelength is turned on and other lasers at other respective wavelengths are turned off. For example, the controller 112 controls the lasers 120/204 so that one of the lasers 120/204 (e.g., laser 204-2) is turned on and the remaining lasers 120/204 (e.g., the lasers 204-1, 204-3, and 204-4) are turned off.

At block 622, the controller configures the optical modulators of the optical transmitter for the second type of modulation. For example, the controller 112 sets the modulator operating point of the MZ modulators 212 to a second modulator operating point (different than the first modulator operating point) suitable for the second type of modulation.

At block 624, the controller of the optical transmitter controls the reconfigurable optical network of the optical transmitter so that light from the one laser is provided to multiple modulators of the optical transmitter. For example, the controller 112 controls the reconfigurable optical network 124/232 so that light from the one laser 120/204 (e.g., laser 204-2) is provided to all of the modulators 128/212 of the optical transmitter.

At block 628, the multiple modulators modulate respective data onto one wavelength according to the second type of modulation. In an embodiment, the baseband processor 104 generates modulation signals, which are used to control the multiple modulators 128/212 to modulate data onto one wavelength according to the first type of modulation. In an embodiment, modulating data onto one wavelength at block 628 comprises receiving at driver circuitry 132 modulation signals from the baseband processor 104 and controlling the multiple modulators with the driver circuitry 132 based on the modulation signals from the baseband processor 104.

FIG. 7 is a flow diagram of an example method 700 for operating a reconfigurable optical receiver that is capable of demodulating optical signals that are modulated according to different optical modulation techniques, according to an embodiment. The method 700 is implemented using the reconfigurable optical receiver of FIG. 3 and/or the reconfigurable optical module 400 of FIG. 4A, in an embodiment.

FIG. 7 is described with reference to FIGS. 3 and 4A for explanatory purposes. In other embodiments, the method 700 is implemented using another suitable reconfigurable optical receiver different than the reconfigurable optical receiver of FIG. 3 and/or using another suitable reconfigurable optical module different than the reconfigurable optical module of FIG. 4A.

At block 704, a type of modulation that the reconfigurable optical receiver is to process is determined. The reconfigurable optical receiver is capable of demodulating optical signals that are modulated according to a plurality of different types of optical modulation techniques, including at least a first type and a second type. In an embodiment, the first type does not involve use of an optical processor of the reconfigurable optical receiver, and the second type involves use of an optical processor. For example, the first type corresponds to intensity modulation (e.g., IMDD modulation), and the second type corresponds to coherent modulation (e.g., DQPSK or M-QAM modulation), in an embodiment.

In an embodiment, the controller 312 of the optical receiver 300 determines the type of modulation at block 704.

In response to determining at block 704 that the type of modulation that the reconfigurable optical receiver is to process is the first type, the flow proceeds to block 708. At block 708, a reconfigurable optical network of the reconfigurable optical receiver is controlled so that an optical signal corresponding to a signal received by the reconfigurable optical receiver bypasses an optical processor of the reconfigurable optical receiver. For example, the reconfigurable optical network 328/404 is controlled so that an output of the optical demultiplexer 420 bypasses the optical processor 412. For example, the controller 312 of the optical receiver 300 generates a control signal to control the optical switch 424 so that the output of the optical demultiplexer 420 bypasses the optical processor 412. In another embodiment in which the reconfigurable optical network includes an optical switch coupled to an input of the optical demultiplexer, a control signal controls the optical switch so that an optical signal bypasses the optical processor and is provided to an input of the optical demultiplexer 420.

At block 712, the optical signal that bypasses the optical signal at block 708 is provided to a multiple-input photodiode of a photodiode circuit of the reconfigurable optical receiver. For example, the output of the optical demultiplexer 420 bypasses the optical processor 412 and is received at a first side of a multiple-input photodiode of the photodiode circuit 440-2.

On the other hand, in response to determining at block 704 that the type of modulation that the reconfigurable optical receiver is to process is the second type, the flow proceeds to block 716. At block 716, the reconfigurable optical network of the reconfigurable optical receiver is controlled so that the optical signal corresponding to the signal received by the reconfigurable optical receiver is provided to the optical processor of the reconfigurable optical receiver. For example, the reconfigurable optical network 328/404 is controlled so that an output of the optical demultiplexer 420 is provided to the PBS 428, which is coupled to the optical processor 412. For example, the controller 312 of the optical receiver 300 generates a control signal to control the optical switch 424 so that the output of the optical demultiplexer 420 is provided to the PBS 428. In another embodiment in which the reconfigurable optical network includes an optical switch coupled to an input of the optical demultiplexer, a control signal controls the optical switch so that an optical signal bypasses the optical demultiplexer 420 and is provided to an input of the PBS 428.

At block 720, multiple outputs of the optical processor are provided to the photodiode circuit of the reconfigurable optical receiver, including providing a first output of the optical processor 120 to the multiple-input photodiode. For example, outputs of the optical processor 412 are provided to the photodiode circuits 440, including providing a first output of the optical processor 412 to a second side of the multiple-input photodiode of the photodiode circuit 124, the second side being opposite to the first side of the multiple-input photodiode. In another embodiment, the first output of the optical processor 412 to an active region on the first side of the multiple-input photodiode.

At block 724, a current signal output of the photodiode circuit is converted to a voltage signal using a TIA. For example, a current signal output by the photodiode circuit 124-1 is converted to a voltage signal by the TIA 128-1.

At block 728, the voltage signal generated at block 724 is sampled by an ADC to generate a digital domain signal. For example, an ADC of the baseband processor 308 samples the voltage signal output by the TIA 128-1.

At block 732, a DSP processes the digital domain signal generated at block 732 to recover information bits from the digital domain signal. For example, the baseband processor 308 processes the digital domain signal generated by the ADC.

Embodiment 1: An optical module for use with multiple optical modulation techniques, the optical, the optical module comprising: a plurality of lasers, each of at least some of the lasers configured to be selectively turned on and turned off depending on a type of modulation to be used, each laser corresponding to a respective wavelength; an optical modulation system comprising a plurality of optical modulators; and a reconfigurable optical network that is configured to selectively direct light from the plurality of lasers to the optical modulation system differently depending on the type of modulation to be used.

Embodiment 2: The optical module of embodiment 1, wherein: the plurality of lasers are configurable so that multiple lasers among the plurality of lasers are i) turned on in a first configuration of the optical module and ii) turned off in a second configuration of the optical module; and the reconfigurable optical network is configurable so that i) light from respective lasers among the multiple lasers are directed to respective modulators in the first configuration, and ii) light from a first laser that is turned on in the second configuration is directed to multiple modulators in the second configuration.

Embodiment 3: The optical module of embodiment 2, wherein the reconfigurable optical network comprises: a first variable optical coupler having i) a first input coupled to the first laser, ii) a first output, and iii) a second output; a second variable optical coupler having i) a first input coupled to the first output of the first variable optical coupler, ii) a first output coupled to an input of a first optical modulator among the plurality of optical modulators, and iii) a second output coupled to an input of a second optical modulator among the plurality of optical modulators; and a third variable optical coupler having i) a first input coupled to the second output of the first variable optical coupler, ii) a first output coupled to an input of a third optical modulator among the plurality of optical modulators, and iii) a second output coupled to an input of a fourth optical modulator among the plurality of optical modulators.

Embodiment 4: The optical module of embodiment 3, wherein: the first variable optical coupler includes a second input coupled to a second laser among the plurality of lasers; the second variable optical coupler includes a second input coupled to a third laser among the plurality of lasers; and a third variable optical coupler includes a second input coupled to a fourth laser among the plurality of lasers.

Embodiment 5: An optical transceiver comprising the optical module of any of embodiments 1-4, the optical transceiver further comprising: a controller configured to generate control signals to selectively turn on and turn off the at least some of the lasers depending on the type of modulation to be used; and a baseband processor configured to receive data that is to be transmitted, and generate, based on the data that is to be transmitted, modulation signals for controlling the plurality of optical modulators.

Embodiment 6: The optical transceiver of embodiment 5, wherein baseband processor includes the controller.

Embodiment 7: A method of controlling a reconfigurable optical module for transmitting information via an optical medium, the method comprising: determining, at a controller, a type of modulation that is to be used to transmit the information via the optical medium, the type of modulation being determined from a plurality of different types of optical modulation techniques, including at least a first type and a second type; controlling, by the controller, a plurality of lasers of the reconfigurable optical module to one of i) turn on or ii) turn off at least some of lasers among the plurality of lasers depending on the type of modulation to be used, each laser corresponding to a respective wavelength; and controlling, by the controller, a reconfigurable optical network of the reconfigurable optical module to selectively direct light from the plurality of lasers to an optical modulation system of the reconfigurable optical module differently depending on the type of modulation to be used.

Embodiment 8: The method of controlling the reconfigurable optical module of embodiment 7, wherein: controlling the plurality of lasers comprises controlling the plurality of lasers so that multiple lasers among the plurality of lasers are i) turned on in the first configuration of the optical module, and ii) turned off in the second configuration of the optical module; and controlling the reconfigurable optical network comprises controlling the reconfigurable optical network so that i) light from respective lasers among the multiple lasers are directed to respective modulators in the first configuration, and ii) light from a first laser that is turned on in the second configuration is directed to multiple modulators in the second configuration.

Embodiment 9: The method of controlling the reconfigurable optical module of either of embodiments 7 or 8, wherein controlling the reconfigurable optical network comprises: controlling a first variable optical coupler having a first input coupled to the first laser, so that light from the first laser i) is directed only to a first output of the first variable optical coupler in the first configuration, and iii) is directed to the first output of the first variable optical coupler and a second output of the first variable optical coupler in the second configuration; controlling a second variable optical coupler having a first input coupled to the first output of the first variable optical coupler so that light from the first laser i) is directed, in the first configuration, only to a first output of the second variable optical coupler that is coupled to a first modulator among the plurality of modulators, and iii) is directed, in the second configuration, to the first output of the first variable optical coupler and a second output of the second variable optical coupler that is coupled to a second modulator among the plurality of modulators; and controlling a third variable optical coupler having a first input coupled to the second output of the first variable optical coupler so that light received via the first input of the third variable optical coupler i) is directed, in the first configuration, only to a first output of the third variable optical coupler that is coupled to a third modulator among the plurality of modulators, and iii) is directed, in the second configuration, to the first output of the first variable optical coupler and a second output of the second variable optical coupler that is coupled to a fourth modulator among the plurality of modulators.

Embodiment 10: The method of controlling the reconfigurable optical module of embodiment 9, controlling the reconfigurable optical network further comprises: controlling the first variable optical coupler so that light from a second laser coupled to a second input of the first variable optical coupler is directed only to the second output of the first variable optical coupler in the first configuration; controlling the second variable optical coupler so that light from a third laser coupled to a second input of the second variable optical coupler is directed, in the first configuration, only to the second output of the second variable optical coupler; and controlling the third variable optical coupler so that light from a fourth laser coupled to a second input of the third variable optical coupler is directed, in the first configuration, only to the second output of the third variable optical coupler.

Embodiment 11: A method of controlling an optical transceiver comprising the method of any of embodiments 7-10, the method of controlling the optical transceiver further comprising: receiving, at a baseband processor of the transceiver, data that is to be transmitted via an optical medium; generating, at the baseband processor, modulation signals for controlling the plurality of optical modulators based on the data received at the baseband processor; and providing the modulation signals to the optical module to control the plurality of optical modulators.

Embodiment 12: An optical module for use with multiple optical modulation techniques, the optical module comprising: optical-to-electrical conversion circuitry that includes a plurality of photodiodes coupled to a plurality of transimpedance amplifiers (TIAs), the plurality of photodiodes including multiple-input photodiodes, each multiple-input photodiode including a first side and a second side that is opposite the first side; an optical processor that is configured to optically process one or more optical signals corresponding to coherent modulation, the optical processor being coupled to the plurality of photodiodes, including multiple outputs of the optical processor coupled to the respective first sides of the multiple-input photodiodes; and an optical network that is configured to i) in a first configuration corresponding to a first modulation technique, direct optical signals corresponding to light received via an optical medium to the respective second sides of the multiple-input photodiodes so that the light bypasses the optical processor, and ii) in a second configuration corresponding to a second modulation technique, direct one or more optical signals corresponding to light received via the optical medium to one or more inputs of the optical processor.

Embodiment 13: The optical module of embodiment 12, wherein the optical network comprises: an optical demultiplexer having a plurality of outputs optically coupled to the respective second sides of the multiple-input photodiodes.

Embodiment 14: The optical module of embodiment 13, wherein the optical network further comprises: an optical switch having i) an input coupled to one of the outputs of the optical demultiplexer, ii) a first output coupled to a second side of one of the multiple-input photodiodes, and iii) a second output coupled to one or more inputs of the optical processor, wherein i) in the first configuration corresponding to the first modulation technique, the optical switch directs an optical signal from the one output of the optical demultiplexer to the second sides of the one multiple-input photodiode, and ii) in the second configuration corresponding to the second modulation technique the optical switch directs the optical signal from the one output of the optical demultiplexer to the one or more inputs of the optical processor.

Embodiment 15: The optical module of embodiment 14, wherein the optical network further comprises: a polarization beam splitter coupled between the second output of the optical switch and the optical processor.

Embodiment 16: An optical receiver that includes the optical module of any of embodiments 12-15, further comprising: a plurality of analog-to-digital converters (ADCs) coupled to the plurality of TIAs, the plurality of ADCs to convert analog outputs of the TIAs to respective digital domain signals.

Embodiment 17: The optical receiver of embodiment 16, further comprising: a baseband processor coupled to the plurality of ADCs, the baseband processor configured to recover information bits from the digital domain signals.

Embodiment 18: A method of operating a reconfigurable optical module, the optical module including optical-to-electrical conversion circuitry that includes a plurality of photodiodes coupled to a plurality of transimpedance amplifiers (TIAs), the plurality of photodiodes including multiple-input photodiodes, each multiple-input photodiode including a first side and a second side that is opposite the first side, the optical module further including an optical processor that is configured to optically process one or more optical signals corresponding to coherent modulation, the optical processor being coupled to the plurality of photodiodes, including multiple outputs of the optical processor coupled to the respective first sides of the multiple-input photodiodes, the method comprising: determining, at a controller, a type of modulation for which the reconfigurable optical module is to process optical signals received via an optical medium, the type of modulation being determined from a plurality of different types of optical modulation techniques, including at least a first type and a second type; and controlling, by a controller, a reconfigurable optical network of the reconfigurable optical module to selectively i) in a first configuration corresponding to a first modulation technique, direct optical signals corresponding to light received via the optical medium to respective first sides of the multiple-input photodiodes so that the light bypasses the optical processor, and ii) in a second configuration corresponding to a second modulation technique, direct one or more optical signals corresponding to light received via the optical medium to one or more inputs of the optical processor.

Embodiment 19: The method of operating the reconfigurable optical module of embodiment 18, further comprising, in the first configuration: demultiplexing, with an optical demultiplexer, light at respective wavelengths from an optical signal corresponding to light received via the optical medium; and providing respective optical signals output by the optical demultiplexer the respective second sides of the multiple-input photodiodes.

Embodiment 20: The method of operating the reconfigurable optical module of embodiment 19, wherein the reconfigurable optical network includes an optical switch having i) an input coupled to one of the outputs of the optical demultiplexer, ii) a first output coupled to a second side of one of the multiple-input photodiodes, and iii) a second output coupled to one or more inputs of the optical processor, and wherein controlling the reconfigurable optical network comprises: controlling, by the controller, the optical switch so that i) in the first configuration corresponding to the first modulation technique, the optical switch directs an optical signal from the one output of the optical demultiplexer to the second sides of the one multiple-input photodiode, and ii) in the second configuration corresponding to the second modulation technique the optical switch directs the optical signal from the one output of the optical demultiplexer to the one or more inputs of the optical processor.

Embodiment 21: The method of operating the reconfigurable optical module of embodiment 20, further comprises, the second configuration: splitting, by a polarization beam splitter, an output signal from the second output of the optical switch into a first polarized signal and a second polarized signal; and providing the first polarized signal and the second polarized signal to inputs of the optical processor.

Embodiment 22: A method of operating an optical receiver including the method of any of embodiments 18-21, the method further comprising: converting, by a plurality of analog-to-digital converters (ADCs), analog outputs of the TIAs to respective digital domain signals.

Embodiment 23: The method of operating the optical receiver of embodiment 22, further comprising: recovering, by a baseband processor, information bits from the digital domain signals.

Embodiment 24: The optical module of any of embodiments 1-6, wherein: the optical modulation system is configurable so that the plurality of modulators are i) configured to modulate according to a first modulation technique when the optical modulation system is in a first configuration, and ii) configured to modulate according to a second modulation technique when the optical modulation system is in a second configuration.

Embodiment 25: The method of controlling the reconfigurable optical module of any of embodiments 7-11, further comprising: configuring the optical modulation system so that a plurality of modulators of the optical modulation system are i) configured to modulate according to the first modulation technique when the optical modulation system is in a first configuration, and ii) configured to modulate according to the second modulation technique when the optical modulation system is in a second configuration.

Embodiment 24: An optical transceiver comprising i) any of embodiments 1-6 or 24, and ii) any of embodiments 12-17.

Embodiment 25: A method of operating an optical transceiver comprising i) any of embodiments 7-11 or 25, and ii) any of embodiments 18-23.

Some of the various blocks, operations, and techniques described above may be implemented utilizing hardware, a processor executing firmware instructions, a processor executing software instructions, or any suitable combination thereof. When implemented utilizing a processor executing software or firmware instructions, the software or firmware instructions may be stored in any suitable computer readable memory. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. An optical module for use with multiple optical modulation techniques, the optical module comprising:
- a plurality of lasers, each of at least some of the lasers configured to be selectively turned on and turned off depending on a type of modulation to be used, each laser corresponding to a respective wavelength, wherein the plurality of lasers are configurable so that multiple lasers among the plurality of lasers are i) turned on in a first configuration of the optical module and ii) turned off in a second configuration of the optical module;
- an optical modulation system comprising a plurality of optical modulators; and
- a reconfigurable optical network that is configured to selectively direct light from the plurality of lasers to the optical modulation system differently depending on the type of modulation to be used, wherein the reconfigurable optical network is configurable so that i) light from respective lasers among the multiple lasers are directed to respective modulators in the first configuration, and ii) light from a first laser that is turned on in the second configuration is directed to multiple modulators in the second configuration, and wherein the reconfigurable optical network comprises:
  - a first variable optical coupler having i) a first input coupled to the first laser, ii) a first output, and iii) a second output,
  - a second variable optical coupler having i) a first input coupled to the first output of the first variable optical coupler, ii) a first output coupled to an input of a first optical modulator among the plurality of optical modulators, and iii) a second output coupled to an input of a second optical modulator among the plurality of optical modulators, and
  - a third variable optical coupler having i) a first input coupled to the second output of the first variable optical coupler, ii) a first output coupled to an input of a third optical modulator among the plurality of optical modulators, and iii) a second output coupled to an input of a fourth optical modulator among the plurality of optical modulators.

2. The optical module of claim 1, further comprising:
- a polarization beam rotator combiner (PRBC) configured to combine light from the plurality of optical modulators to generate an optical transmit signal when any of multiple ones of the optical modulation techniques are being used.

3. The optical module of claim 1, wherein:
- the first variable optical coupler includes a second input coupled to a second laser among the plurality of lasers;
- the second variable optical coupler includes a second input coupled to a third laser among the plurality of lasers; and
- a third variable optical coupler includes a second input coupled to a fourth laser among the plurality of lasers.

4. The optical module of claim 2, wherein:
- the optical modulation system is configurable so that the plurality of optical modulators are i) configured to modulate according to a first modulation technique when the optical modulation system is in a first configuration, and ii) configured to modulate according to a second modulation technique when the optical modulation system is in a second configuration.

5. An optical transceiver comprising the optical module of claim 2, the optical transceiver further comprising:
- a controller configured to generate control signals to selectively turn on and turn off the at least some of the lasers depending on the type of modulation to be used; and
- a baseband processor configured to
  - receive data that is to be transmitted, and
  - generate, based on the data that is to be transmitted, modulation signals for controlling the plurality of optical modulators.

6. The optical transceiver of claim 5, wherein the baseband processor includes the controller.

7. The optical module of claim 2, wherein the reconfigurable optical network is a first reconfigurable optical network, and wherein the optical module further comprises:
- optical-to-electrical conversion circuitry that includes a plurality of photodiodes coupled to a plurality of transimpedance amplifiers (TIAs), the plurality of photodiodes including multiple-input photodiodes, each multiple-input photodiode including a first side and a second side that is opposite the first side;
- an optical processor that is configured to optically process one or more optical signals corresponding to coherent modulation, the optical processor being coupled to the plurality of photodiodes, including multiple outputs of the optical processor coupled to the respective first sides of the multiple-input photodiodes; and
- a second reconfigurable optical network that is configured to i) in a first configuration corresponding to a first modulation technique, direct optical signals corresponding to light received via an optical medium to the respective second sides of the multiple-input photodiodes so that the light bypasses the optical processor, and ii) in a second configuration corresponding to a second modulation technique, direct one or more optical signals corresponding to light received via the optical medium to one or more inputs of the optical processor.

8. The optical module of claim 7, wherein the second reconfigurable optical network comprises:

an optical demultiplexer having a plurality of outputs optically coupled to the respective second sides of the multiple-input photodiodes.

9. The optical module of claim 8, wherein the second reconfigurable optical network further comprises:

an optical switch having i) an input coupled to one of the outputs of the optical demultiplexer, ii) a first output coupled to a second side of one of the multiple-input photodiodes, and iii) a second output coupled to one or more inputs of the optical processor, wherein i) in the first configuration corresponding to the first modulation technique, the optical switch directs an optical signal from the one output of the optical demultiplexer to the second sides of the one multiple-input photodiode, and ii) in the second configuration corresponding to the second modulation technique the optical switch directs the optical signal from the one output of the optical demultiplexer to the one or more inputs of the optical processor.

10. The optical module of claim 8, wherein the second reconfigurable optical network further comprises:

a polarization beam splitter coupled between the second output of the optical switch and the optical processor.

11. An optical transceiver that includes the optical module of claim 7, further comprising:

a plurality of analog-to-digital converters (ADCs) coupled to the plurality of TIAs, the plurality of ADCs to convert analog outputs of the TIAs to respective digital domain signals.

12. The optical transceiver of claim 11, further comprising:

a baseband processor coupled to the plurality of ADCs, the baseband processor configured to recover information bits from the digital domain signals.

13. A method of controlling a reconfigurable optical module for transmitting information via an optical medium, the method comprising:

determining, at a controller, a type of modulation that is to be used to transmit the information via the optical medium, the type of modulation being determined from a plurality of different types of optical modulation techniques, including at least a first type and a second type;

controlling, by the controller, a plurality of lasers of the reconfigurable optical module to one of i) turn on or ii) turn off at least some of lasers among the plurality of lasers depending on the type of modulation to be used, each laser corresponding to a respective wavelength; and controlling, by the controller, a reconfigurable optical network of the reconfigurable optical module to selectively direct light from the plurality of lasers to an optical modulation system of the reconfigurable optical module differently depending on the type of modulation to be used, wherein controlling the reconfigurable optical network comprises:

controlling a first variable optical coupler having a first input coupled to the first laser, so that light from the first laser i) is directed only to a first output of the first variable optical coupler in the first configuration, and iii) is directed to the first output of the first variable optical coupler and a second output of the first variable optical coupler in the second configuration, controlling a second variable optical coupler having a first input coupled to the first output of the first variable optical coupler so that light from the first laser i) is directed, in the first configuration, only to a first output of the second variable optical coupler that is coupled to a first modulator among the plurality of optical modulators, and iii) is directed, in the second configuration, to the first output of the first variable optical coupler and a second output of the second variable optical coupler that is coupled to a second modulator among the plurality of optical modulators, and controlling a third variable optical coupler having a first input coupled to the second output of the first variable optical coupler so that light received via the first input of the third variable optical coupler i) is directed, in the first configuration, only to a first output of the third variable optical coupler that is coupled to a third modulator among the plurality of optical modulators, and iii) is directed, in the second configuration, to the first output of the first variable optical coupler and a second output of the second variable optical coupler that is coupled to a fourth modulator among the plurality of optical modulators.

14. The method of controlling the reconfigurable optical module of claim 13, further comprising:

combining, using a polarization beam rotator combiner (PRBC), light from a plurality of optical modulators of the optical modulation system to generate an optical transmit signal when any of multiple ones of the different types of optical modulation techniques are being used.

15. The method of controlling the reconfigurable optical module of claim 13, wherein controlling the reconfigurable optical network further comprises:

controlling the first variable optical coupler so that light from a second laser coupled to a second input of the first variable optical coupler is directed only to the second output of the first variable optical coupler in the first configuration;

controlling the second variable optical coupler so that light from a third laser coupled to a second input of the second variable optical coupler is directed, in the first configuration, only to the second output of the second variable optical coupler; and controlling the third variable optical coupler so that light from a fourth laser coupled to a second input of the third variable optical coupler is directed, in the first configuration, only to the second output of the third variable optical coupler.

16. The method of controlling the reconfigurable optical module of claim 14, further comprising:

configuring the optical modulation system so that the plurality of optical modulators of the optical modulation system are i) configured to modulate according to the first modulation technique when the optical modulation system is in a first configuration, and ii) configured to modulate according to the second modulation technique when the optical modulation system is in a second configuration.

17. A method of controlling an optical transceiver comprising the method of claim 14, the method of controlling the optical transceiver further comprising:

receiving, at a baseband processor of the transceiver, data that is to be transmitted via the optical medium;

generating, at the baseband processor, modulation signals for controlling the plurality of optical modulators based on the data received at the baseband processor; and providing the modulation signals to the optical module to control the plurality of optical modulators.

18. The method of operating the reconfigurable optical module of claim 14, wherein the reconfigurable optical network is a first reconfigurable optical network, wherein the reconfigurable optical module further includes optical-to-electrical conversion circuitry that includes a plurality of photodiodes coupled to a plurality of transimpedance amplifiers (TIAs), the plurality of photodiodes including multiple-input photodiodes, each multiple-input photodiode including a first side and a second side that is opposite the first side, the optical module further including an optical processor that is configured to optically process one or more optical signals corresponding to coherent modulation, the optical processor being coupled to the plurality of photodiodes, including multiple outputs of the optical processor coupled to the respective first sides of the multiple-input photodiodes, the method further comprising:

determining, at the controller, a type of modulation for which the reconfigurable optical module is to process optical signals received via the optical medium, the type of modulation being determined from the plurality of different types of optical modulation techniques, including at least a first type and a second type; and controlling, by a controller, a second reconfigurable optical network of the reconfigurable optical module to selectively i) in a first configuration corresponding to a first modulation technique, direct optical signals corresponding to light received via the optical medium to respective first sides of the multiple-input photodiodes so that the light bypasses the optical processor, and ii) in a second configuration corresponding to a second modulation technique, direct one or more optical signals corresponding to light received via the optical medium to one or more inputs of the optical processor.

19. The method of operating the reconfigurable optical module of claim 18, further comprising, in the first configuration:

demultiplexing, with an optical demultiplexer, light at respective wavelengths from an optical signal corresponding to light received via the optical medium; and providing respective optical signals output by the optical demultiplexer the respective second sides of the multiple-input photodiodes.

20. The method of operating the reconfigurable optical module of claim 19, wherein the second reconfigurable optical network includes an optical switch having i) an input coupled to one of the outputs of the optical demultiplexer, ii) a first output coupled to a second side of one of the multiple-input photodiodes, and iii) a second output coupled to one or more inputs of the optical processor, and wherein controlling the second reconfigurable optical network comprises:

controlling, by the controller, the optical switch so that i) in the first configuration corresponding to the first modulation technique, the optical switch directs an optical signal from the one output of the optical demultiplexer to the second sides of the one multiple-input photodiode, and ii) in the second configuration corresponding to the second modulation technique the optical switch directs the optical signal from the one output of the optical demultiplexer to the one or more inputs of the optical processor.

21. The method of operating the reconfigurable optical module of claim 20, further comprises, the second configuration:

splitting, by a polarization beam splitter, an output signal from the second output of the optical switch into a first polarized signal and a second polarized signal; and providing the first polarized signal and the second polarized signal to inputs of the optical processor.

22. A method of operating an optical transceiver including the method of claim 18, the method further comprising:

converting, by a plurality of analog-to-digital converters (ADCs), analog outputs of the TIAs to respective digital domain signals.

23. The method of operating the optical transceiver of claim 22, further comprising:

recovering, by a baseband processor, information bits from the digital domain signals.

* * * * *